No. 862,427. PATENTED AUG. 6, 1907.
C. M. WEAVER.
POWER OPERATED SHOVEL.
APPLICATION FILED MAR. 29, 1907.
11 SHEETS—SHEET 1.
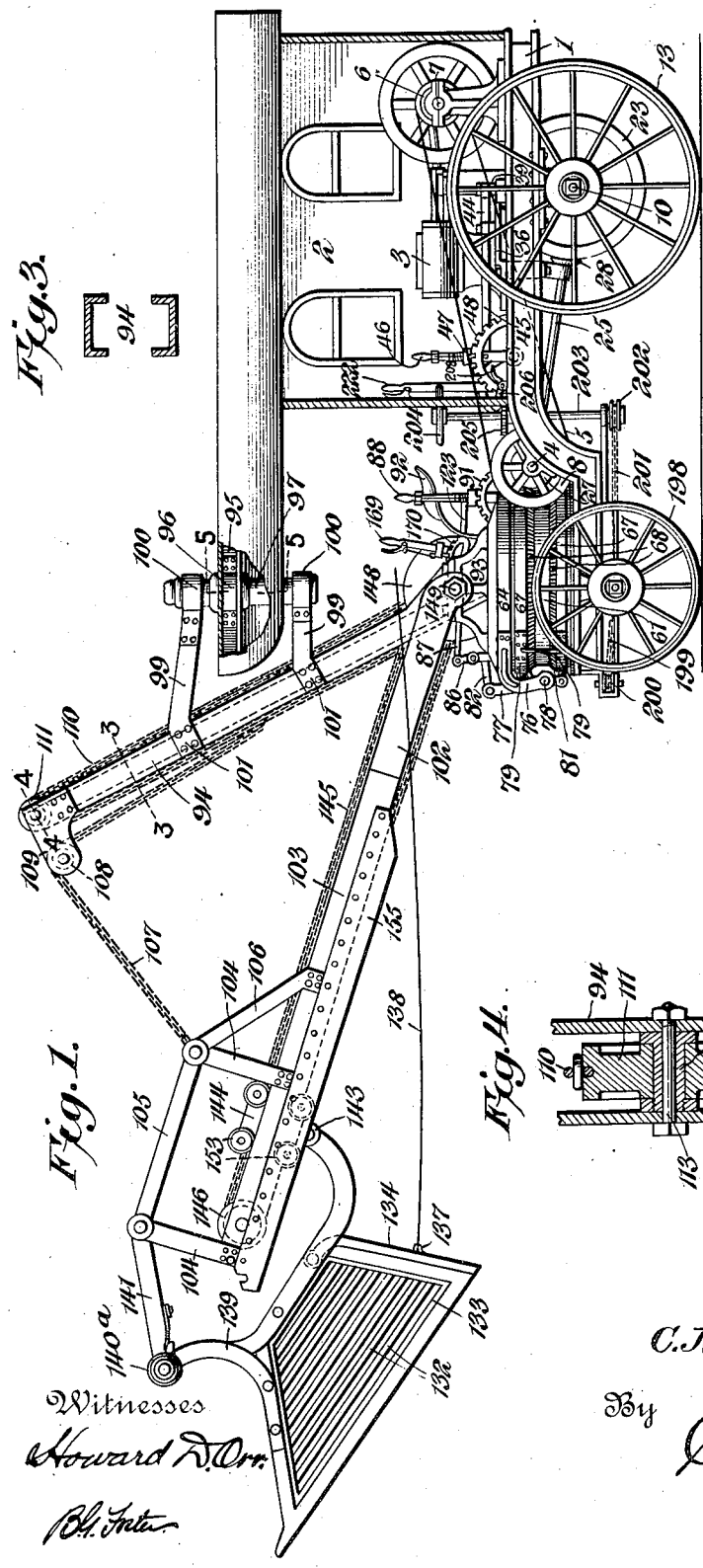
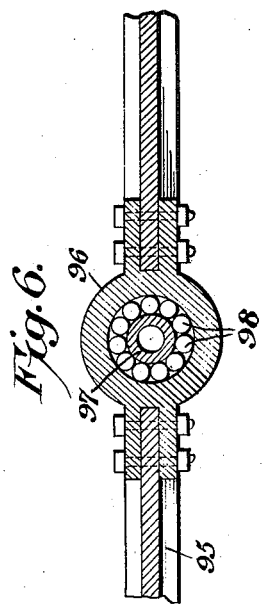
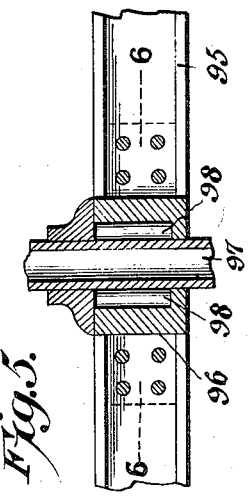
C. M. Weaver, Inventor,
Witnesses

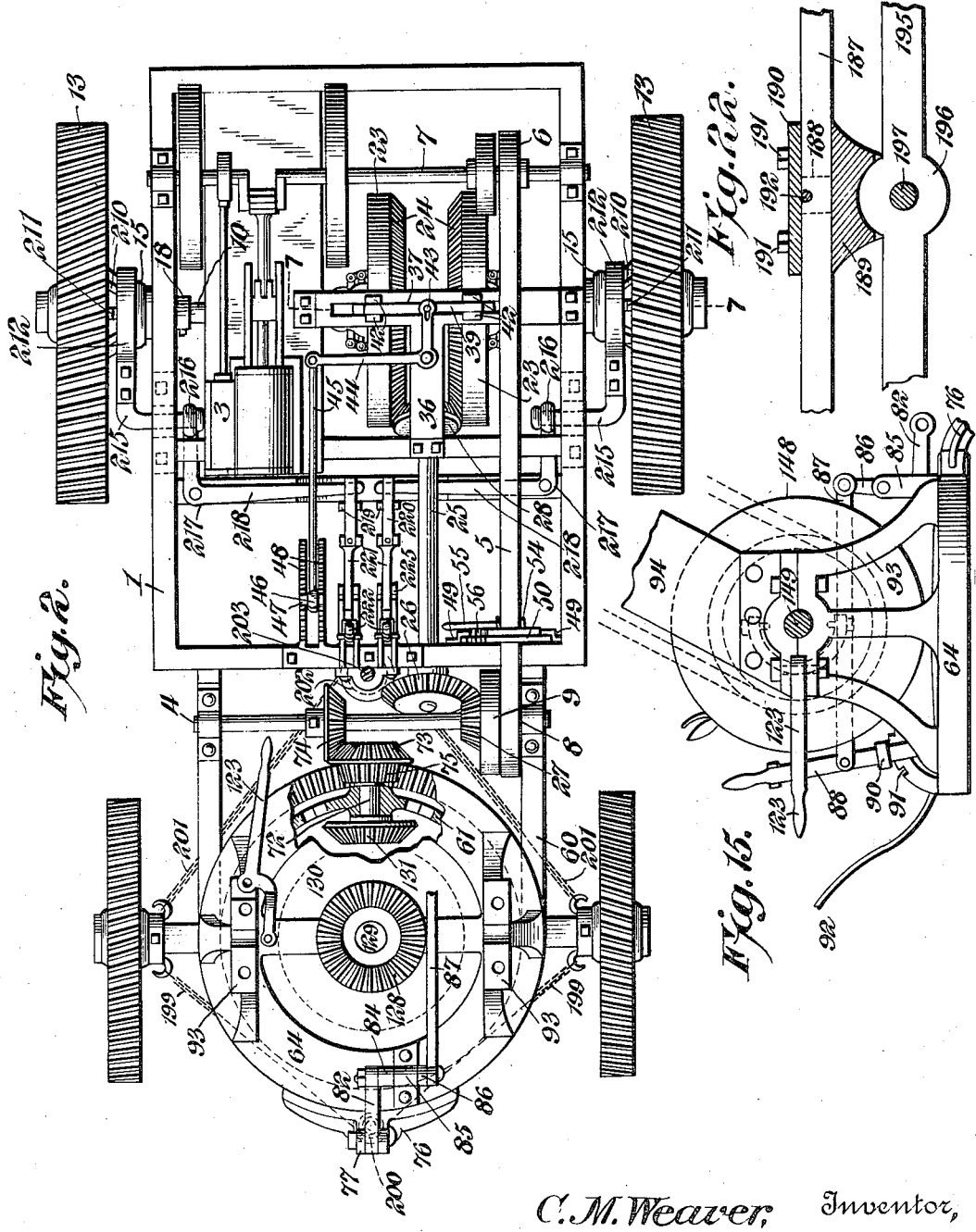

No. 862,427.
PATENTED AUG. 6, 1907.
C. M. WEAVER.
POWER OPERATED SHOVEL.
APPLICATION FILED MAR. 29, 1907.
11 SHEETS—SHEET 3.
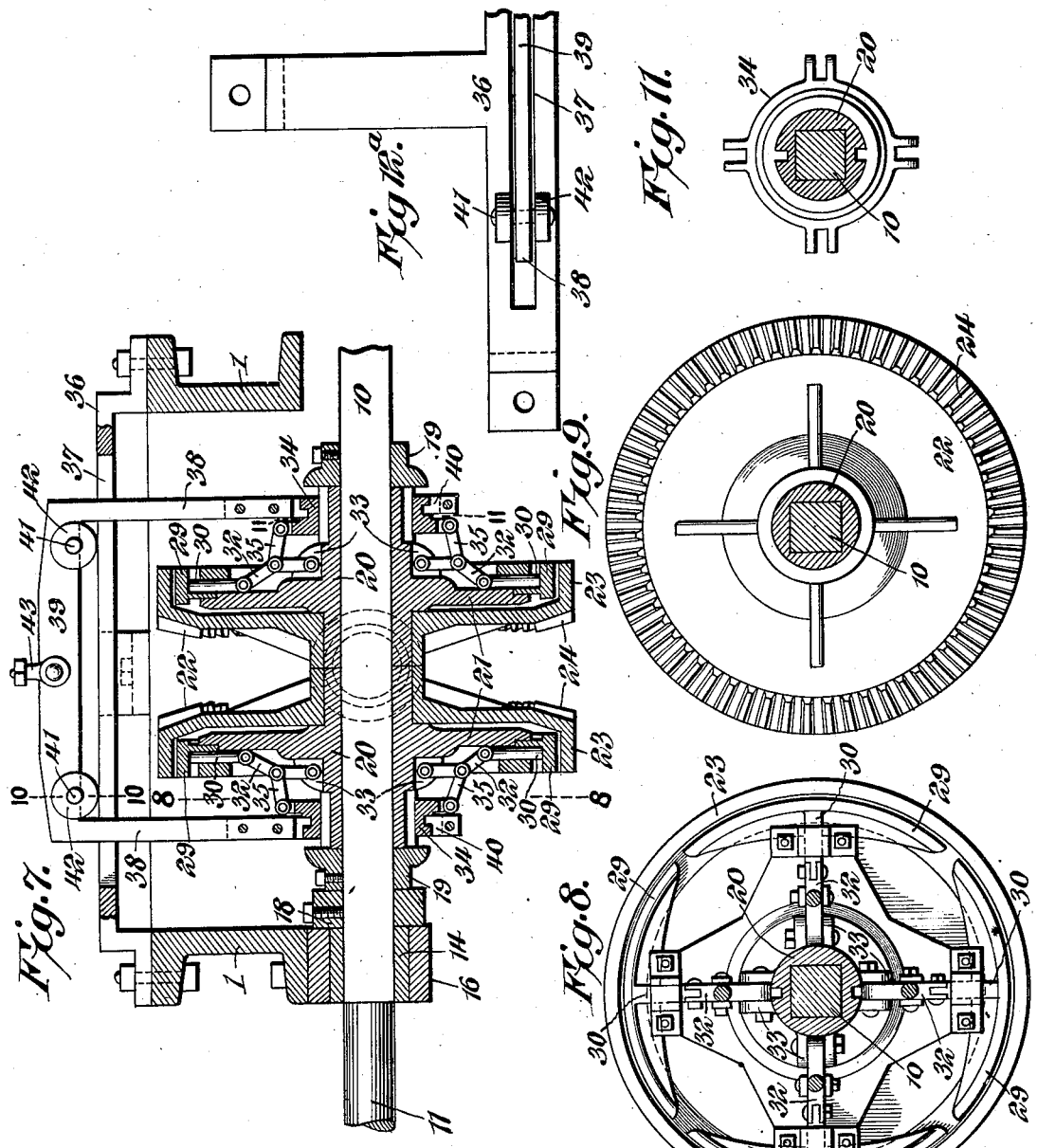
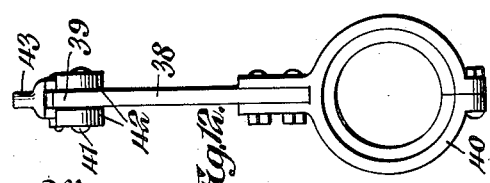
Witnesses
Howard N. O.
B. G. Feter
Inventor
C. M. Weaver,
By
C. G. Siggers.
Attorney

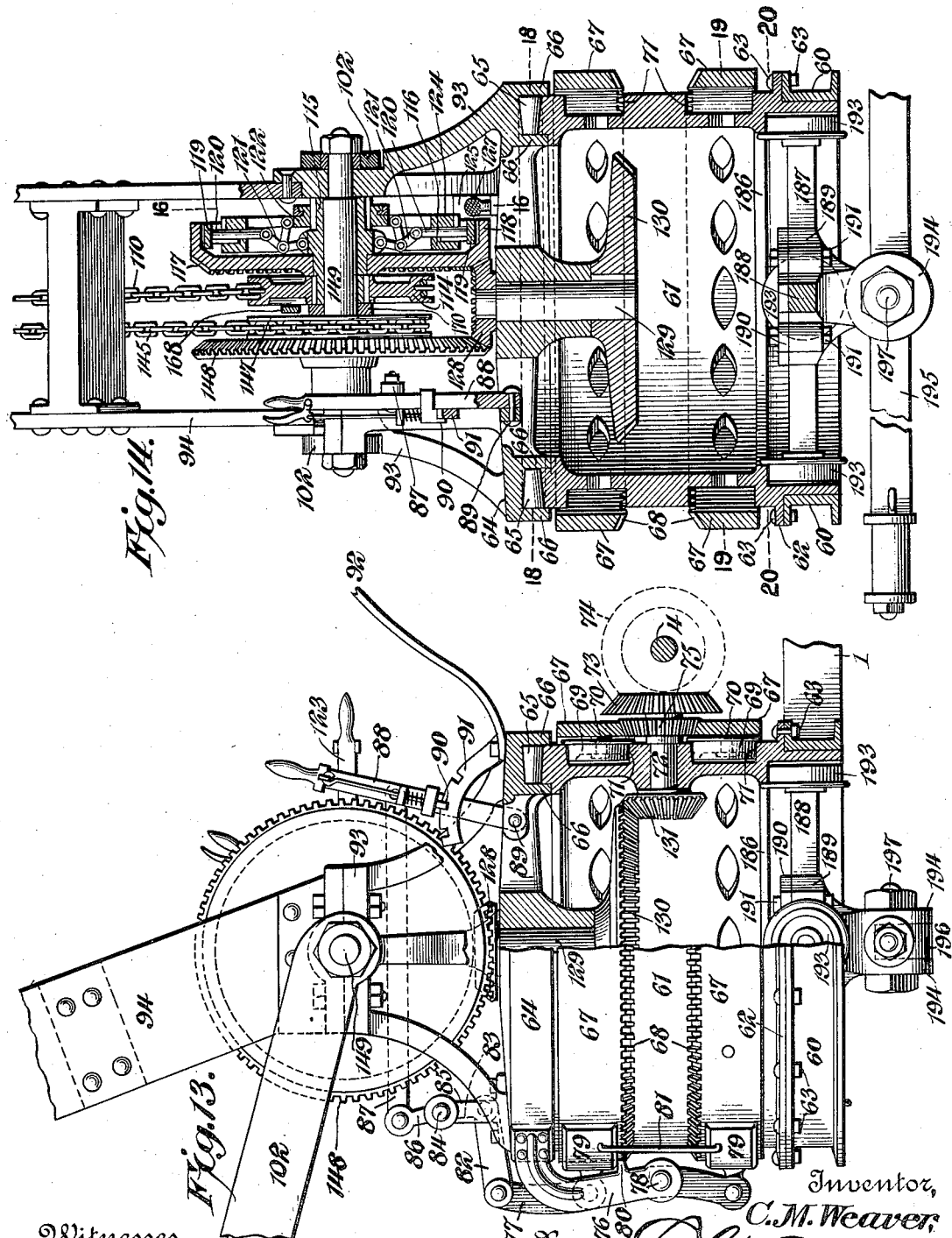

No. 862,427. PATENTED AUG. 6, 1907.
C. M. WEAVER.
POWER OPERATED SHOVEL.
APPLICATION FILED MAR. 29, 1907.
11 SHEETS—SHEET 5.
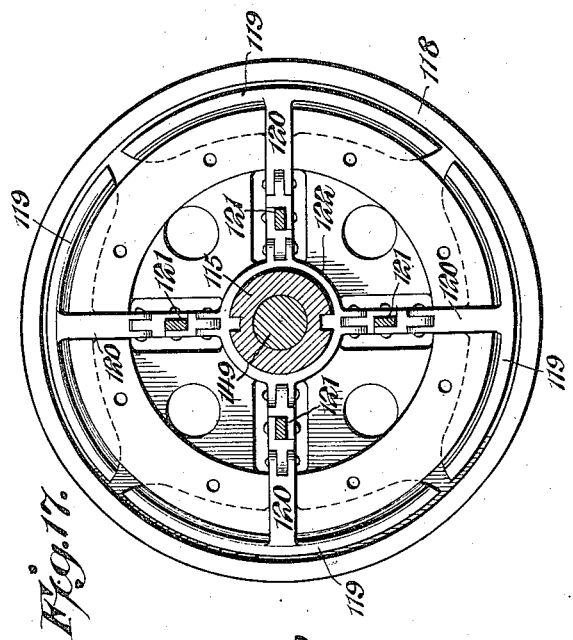
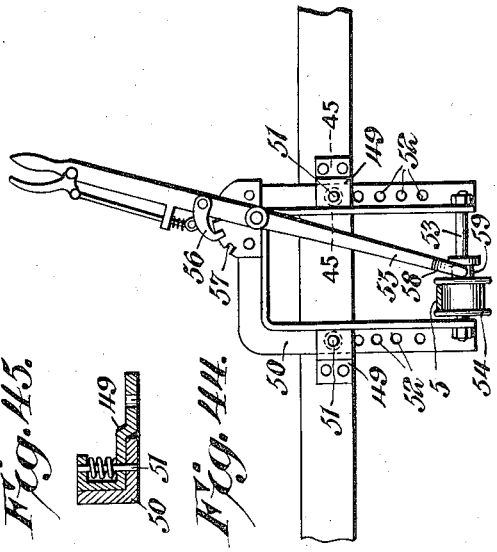
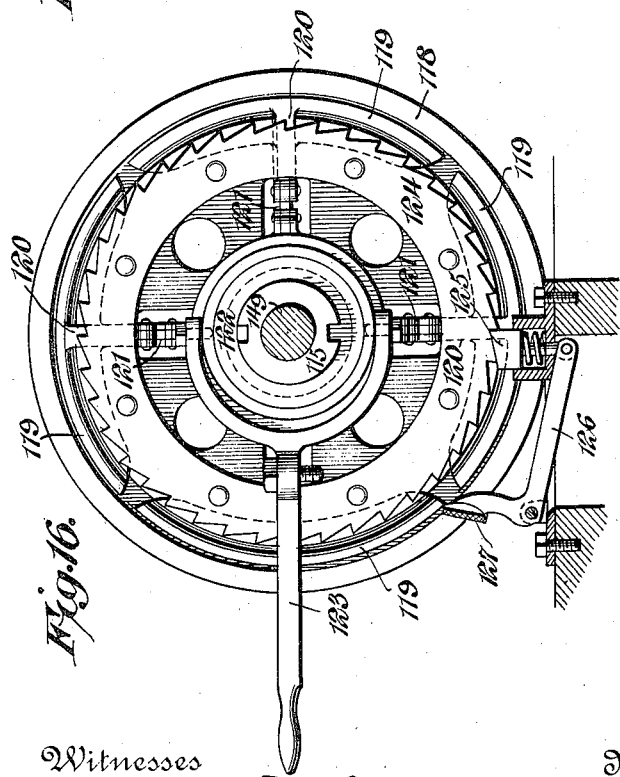
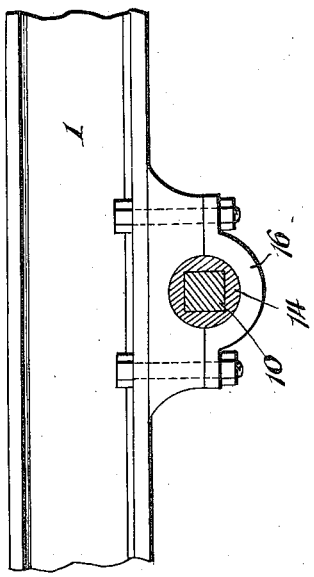
Witnesses
C. M. Weaver, Inventor,
By E. G. Siggers
Attorney No. 862,427. PATENTED AUG. 6, 1907.
C. M. WEAVER.
POWER OPERATED SHOVEL.
APPLICATION FILED MAR. 29, 1907.
11 SHEETS—SHEET 6.
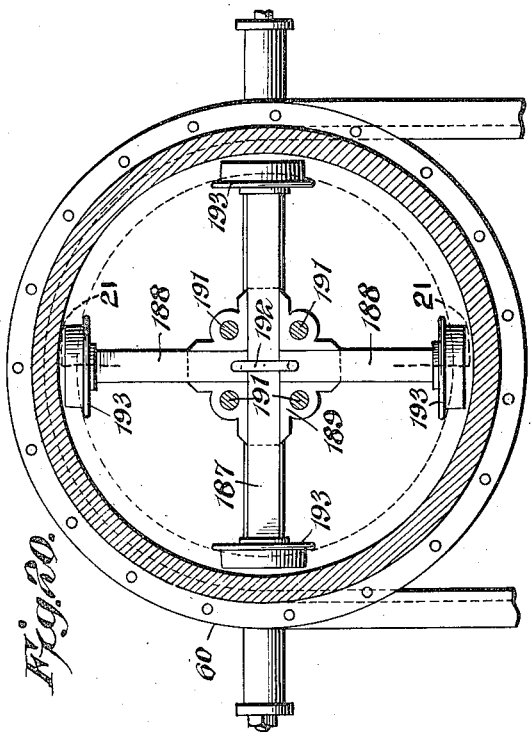
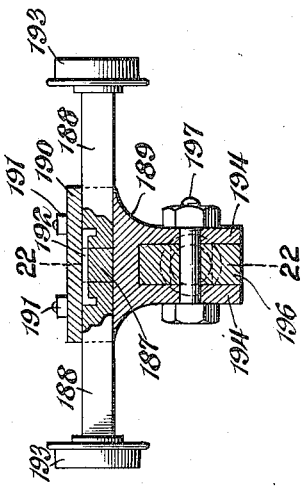
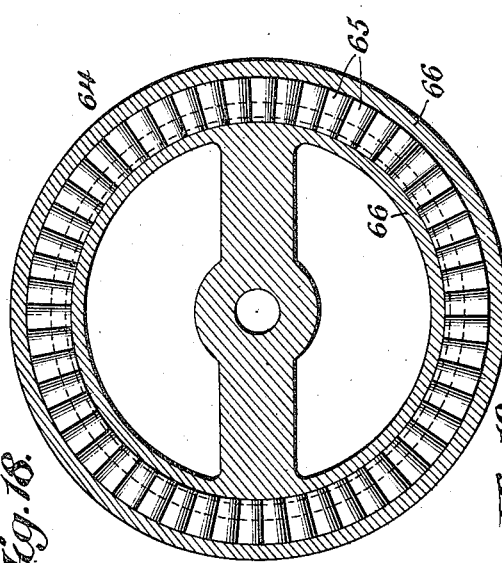
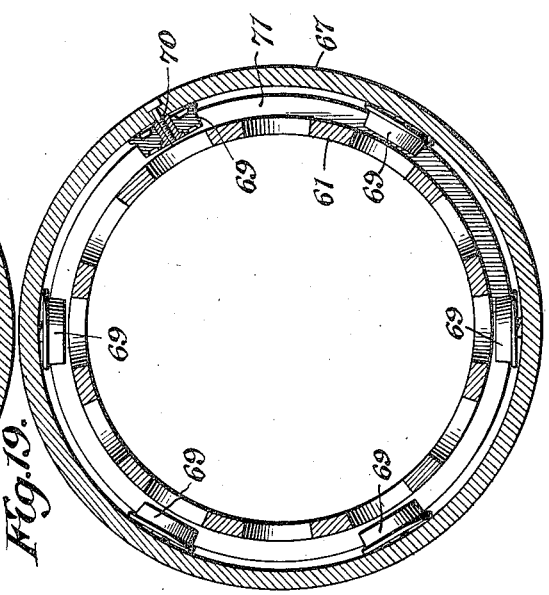
Witnesses
Howard D. Orr
B. G. Fretor
C. M. Weaver, Inventor,
By E. G. Siggers
Attorney

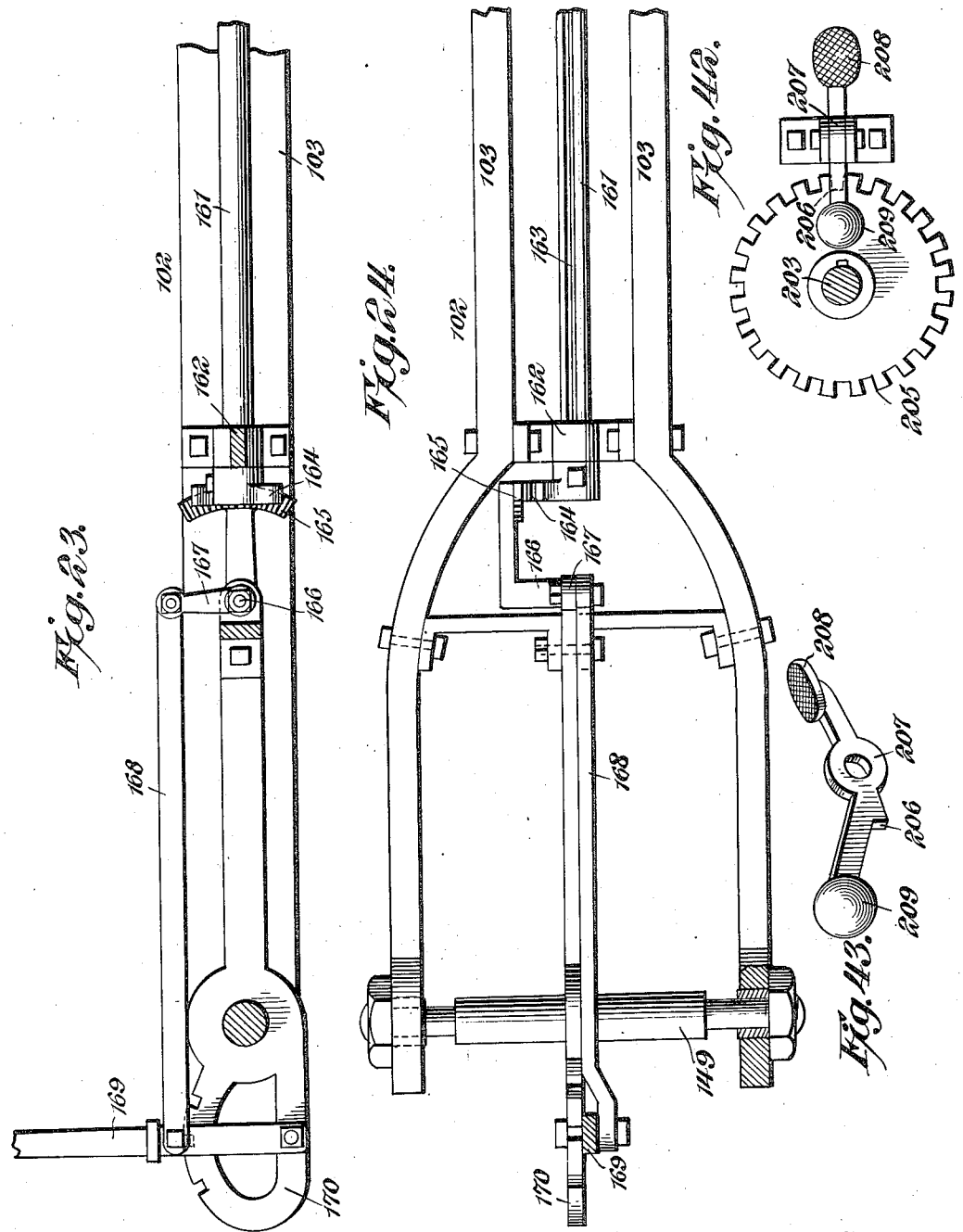

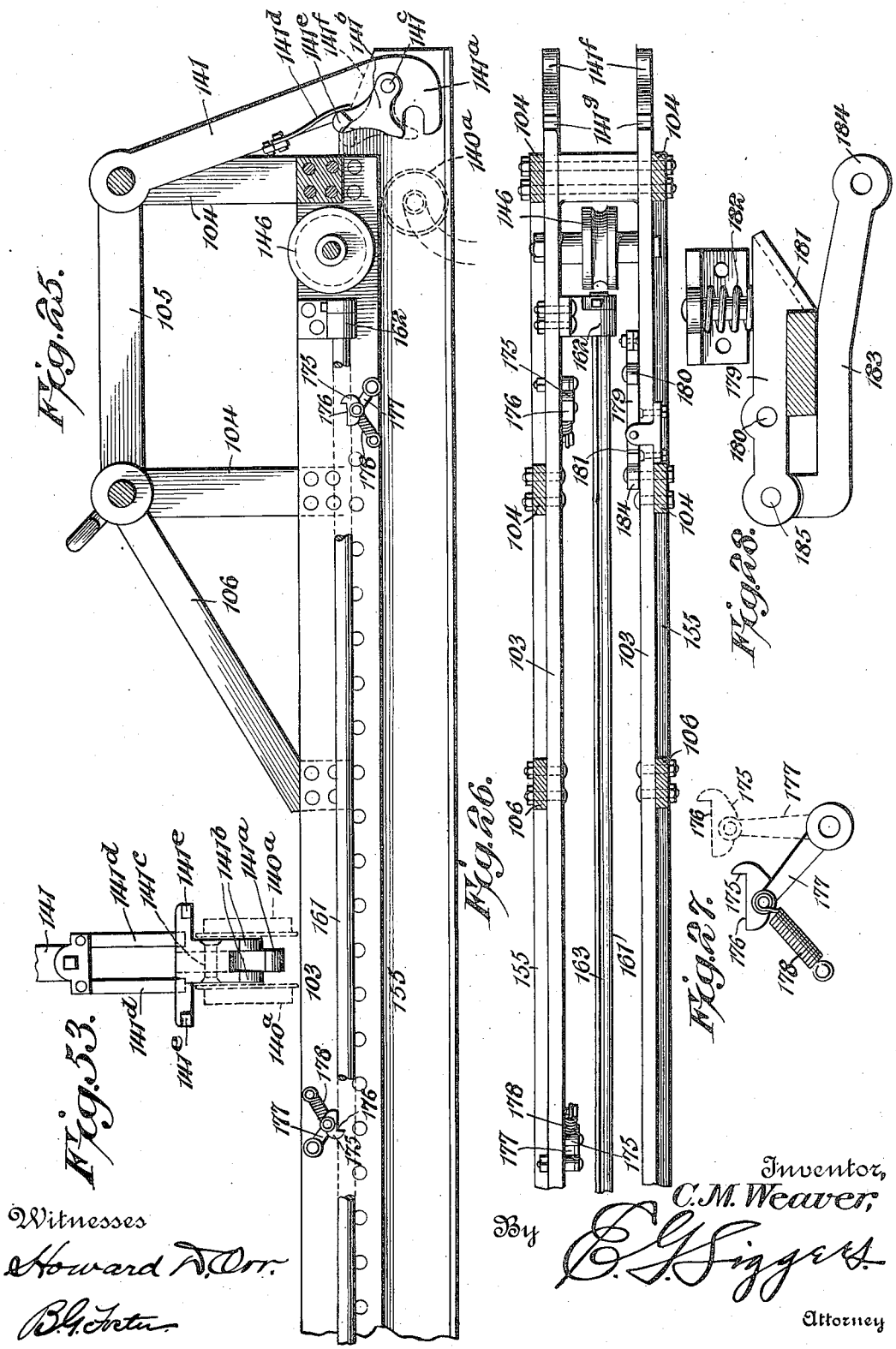

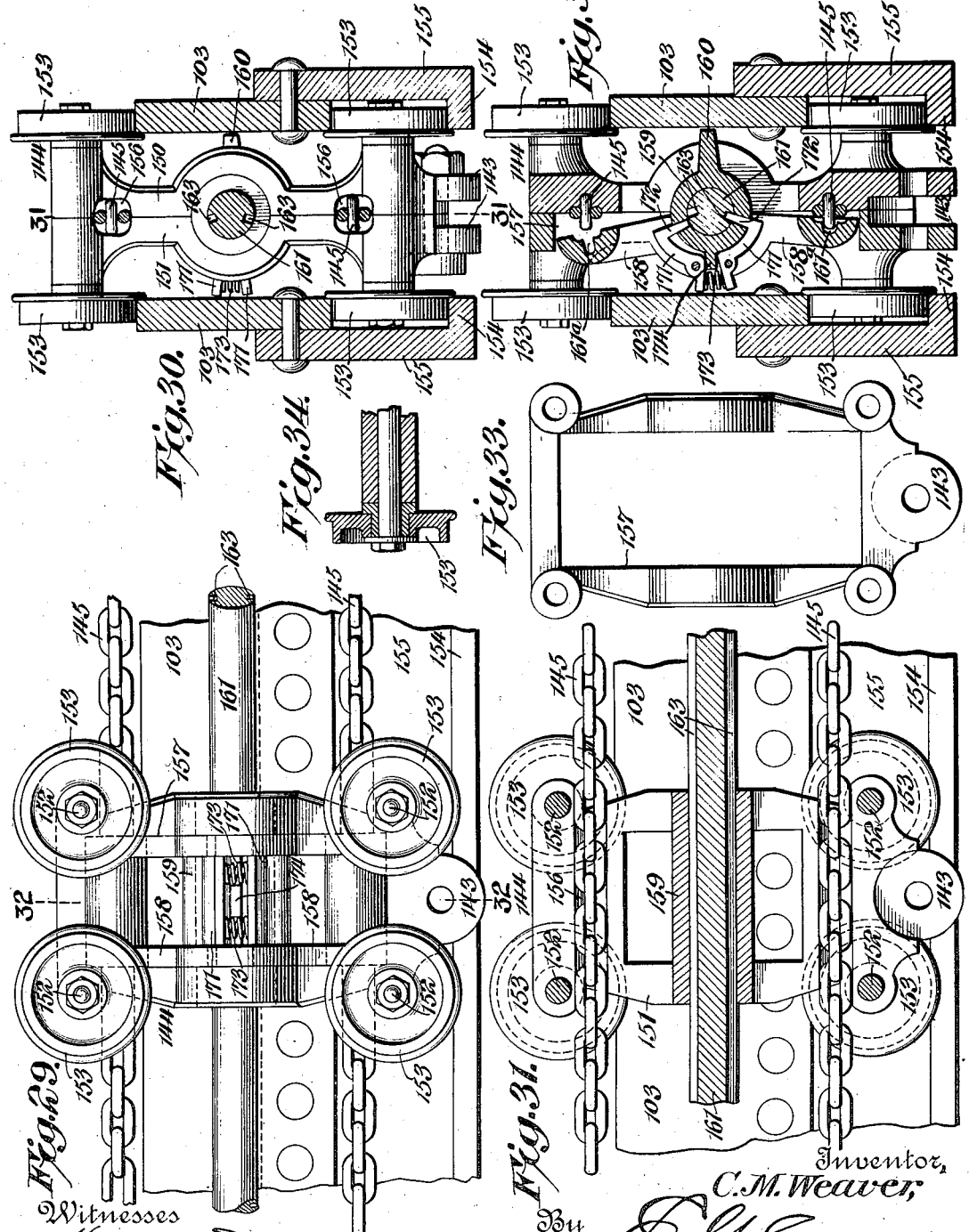

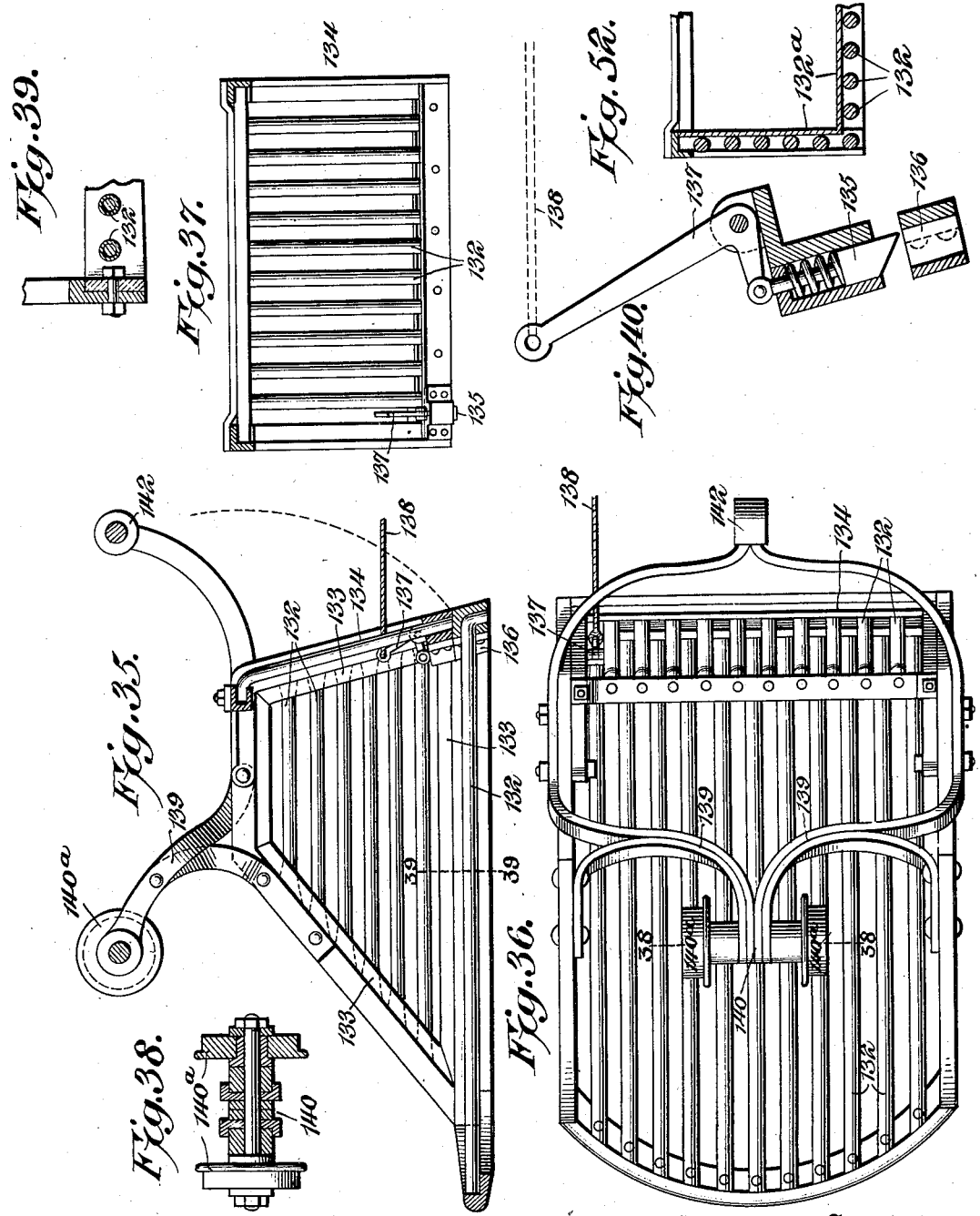

No. 862,427. PATENTED AUG. 6, 1907.
C. M. WEAVER.
POWER OPERATED SHOVEL.
APPLICATION FILED MAR. 29, 1907.
11 SHEETS—SHEET 11.
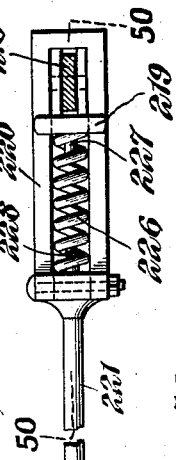
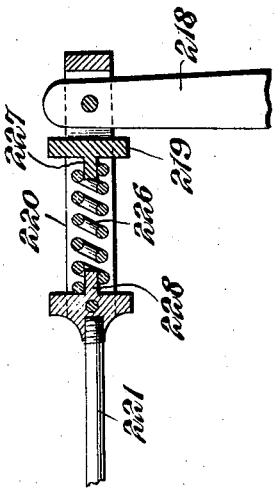
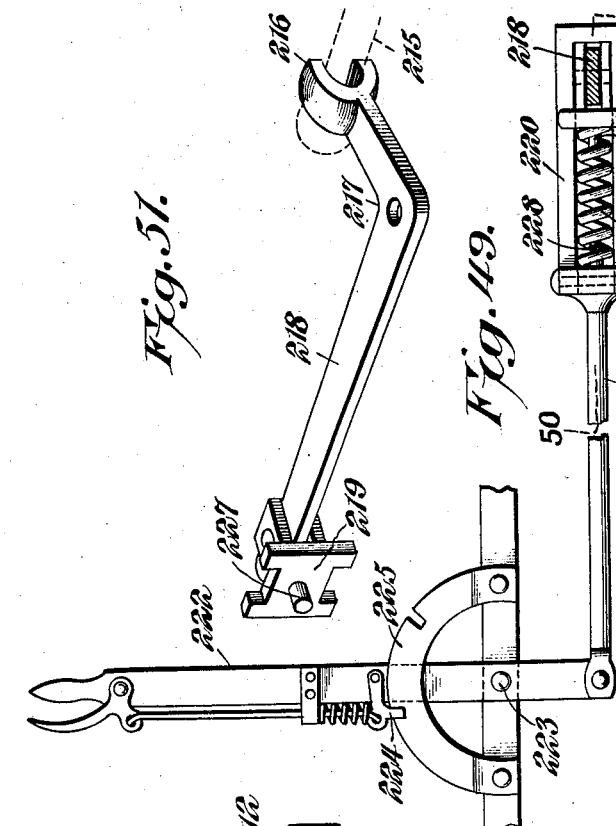
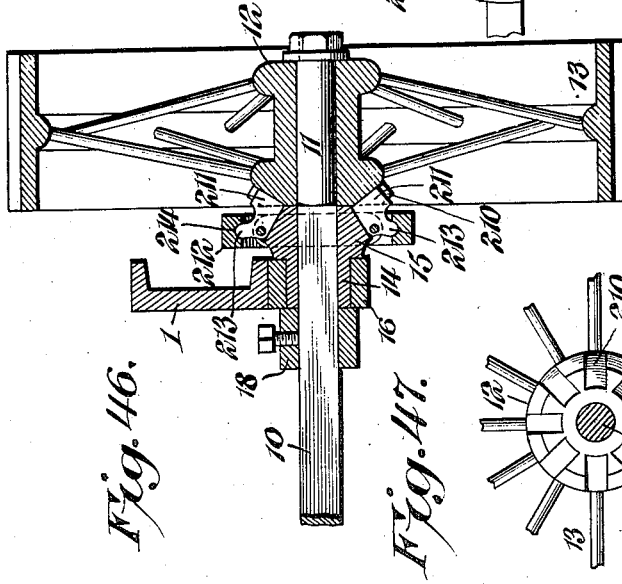
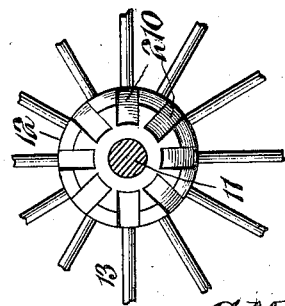
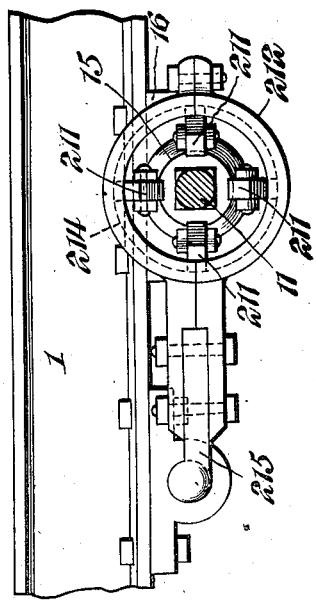
Witnesses
Howard D. Orr
B. J. Foster
Inventor,
C. M. Weaver,
By E. G. Siggers
Attorney

UNITED STATES PATENT OFFICE.

CHARLES M. WEAVER, OF BESSEMER, ALABAMA.

POWER-OPERATED SHOVEL.

No. 862,427.  Specification of Letters Patent.  Patented Aug. 6, 1907.

Application filed March 29, 1907. Serial No. 365,358.

*To all whom it may concern:*

Be it known that I, CHARLES M. WEAVER, a citizen of the United States, residing at Bessemer, in the county of Jefferson and State of Alabama, have invented a new and useful Power-Operated Shovel, of which the following is a specification.

While the present invention was devised more particularly with a view to handling coke, there is no question but that the same, and especially certain features hereinafter claimed, are clearly useful for other purposes.

The primary object of the present invention is to provide novel, simple and effective mechanism for moving a shovel or other carrier in practically any desired direction, so that the same may be readily loaded, the load transported, and said load deposited from the machine at different points.

A further and important object is to provide a power-operated traction or self-propelled machine, wherein the driving power may be wholly utilized, either for propelling the machine or for operating the shovel.

The preferred embodiment of the invention is disclosed in the accompanying drawings, and is described in the following specification: It will be evident, however, from an inspection of the appended claims that the said invention is not limited to the structure disclosed.

In the drawings:—Figure 1 is a side elevation of the machine, the cab being illustrated in section. Fig. 2 is a plan view of the bed frame of the machine and associated mechanism. Fig. 3 is a cross sectional view through the mast on the line 3—3 of Fig. 1. Fig. 4 is a detail sectional view on the line 4—4 of Fig. 1. Fig. 5 is a vertical sectional view through the upper journal bearing for the mast, and is taken on the line 5—5 of Fig. 1. Fig. 6 is a horizontal sectional view on the line 6—6 of Fig. 5. Fig. 7 is a sectional view through the driving mechanism on the line 7—7 of Fig. 2. Fig. 8 is a cross sectional view on the line 8—8 of Fig. 7, showing one of the clutch mechanisms. Fig. 9 is a view in elevation of the inner face of one of the driving gear wheels. Fig. 10 is a detail sectional view on the line 10—10 of Fig. 7. Fig. 11 is a detail sectional view on the line 11—11 of Fig. 7. Fig. 12 is an end elevation of the shifting stirrup or yoke. Fig. 12ª is a plan view of a portion of the guide bracket and shifting stirrup or yoke. Fig. 13 is a side elevation of the mast and boom operating means, portions thereof being shown in section. Fig. 14 is a sectional view at right angles to Fig. 13. Fig. 15 is a side elevation of the upper portion of the structure disclosed in Fig. 13, and on the opposite side to that disclosed in Fig. 13. Fig. 16 is a sectional view on the line 16—16 of Fig. 14. Fig. 17 is a similar view to Fig. 16, but showing the ratchet wheel and retainer removed. Fig. 18 is a horizontal sectional view on the line 18—18 of Fig. 14. Fig. 19 is a similar view on the line 19—19 of Fig. 14. Fig. 20 is a horizontal sectional view on the line 20—20 of Fig. 14. Fig. 21 is a detail sectional view on the line 21—21 of Fig. 20. Fig. 22 is a sectional view on the line 22—22 of Fig. 21. Fig. 23 is a longitudinal sectional view through the inner end of the boom. Fig. 24 is a plan view of the inner end of the boom. Fig. 25 is a vertical sectional view through the outer end of the boom. Fig. 26 is a top plan view of the outer end thereof with the bucket supporting frame shown in section. Fig. 27 is a detail elevation of one of the clutch tripping devices for the carriage. Fig. 28 is a detail view of the automatic lock for the carriage. Fig. 29 is a side elevation of said carriage and a portion of the boom. Fig. 30 is an end elevation of said carriage with a cross sectional view of the boom. Fig. 31 is a longitudinal sectional view through the carriage on the line 31—31 of Fig. 30. Fig. 32 is a cross sectional view through the carriage and boom on the line 32—32 of Fig. 29. Fig. 33 is a detail side elevation of one of the sections of the carriage. Fig. 34 is a detail sectional view showing the axle bearing for one of the wheels. Fig. 35 is a longitudinal sectional view through the shovel. Fig. 36 is a plan view of said shovel. Fig. 37 is a front elevation of the rear gate of the bucket. Fig. 38 is a detail sectional view on the line 38—38 of Fig. 36. Fig. 39 is a sectional view on the line 39—39 of Fig. 35. Fig. 40 is a detail sectional view through the latch of the bucket gate. Fig. 41 is a detail end elevation of one of the bearings for the rear or driving axle of the machine. Fig. 42 is a top plan view of the holding means for the steering wheel. Fig. 43 is a detail perspective view of the holding dog for said steering wheel. Fig. 44 is an end elevation of the belt shifting and tightening means. Fig. 45 is a detail sectional view on the line 45—45 of Fig. 44. Fig. 46 is a detail sectional view through one of the rear driving wheels and associated mechanism for clutching the same to the rear shaft or axle. Fig. 47 is a view of the inner end of a driving wheel hub. Fig. 48 is an end view of a clutch mechanism, the shaft being shown in section. Fig. 49 is a detail elevation of one of the clutch operating mechanisms and associated parts. Fig. 50 is a horizontal sectional view on the line 50—50 of Fig. 49. Fig. 51 is a detail perspective view of the bell crank lever constituting part of the connection between the operating lever and the clutch. Fig. 52 is also a detail cross sectional view on the line 39—39 of Fig. 35, but illustrating the lining placed in the bucket. Fig. 53 is an end elevation of the lower portion of the swinging link 14.

Similar reference numerals designate corresponding parts in all the figures of the drawings.

In the embodiment illustrated, a bed-frame is employed, which is designated generally by the reference numeral 1, and is formed of channel beams. Mounted on the rear portion of this frame is a cab 2 of any desired form or construction, which houses a motor 3. While an explosive engine is preferred, it will be evident to those skilled in the art that any means for producing power may be employed. Journaled on the front portion of the bed-frame and transversely thereof, is a main driving shaft 4, which receives power from the motor or engine 3, through the medium of a belt 5 or other driving connection, said belt passing around a pulley 6 on the engine shaft 7 and about a pulley 8 that is fixed to the driving shaft 4. Another pulley 9 is loosely journaled on the shaft 4, and the belt 5 can be shifted from the pulley 8 to said pulley 9. The machine is propelled by power transmitted through said pulley 9, as hereinafter explained.

A shaft or rear axle 10, having its intermediate portion squared, is provided with round terminal spindles 11, on which are journaled the hubs 12 of rear driving wheels 13. Sleeves 14 are fixed to the ends of the squared portion of the shaft or axle and have enlarged outer ends 15. These sleeves are journaled in boxings 16 secured to the underside of the channel frame, as clearly shown in Figs. 7, 41 and 46. Collars 18 are located on the axle at the inner ends of the sleeves 14 and boxings 16. Mounted on the squared portion of the shaft 10 between the collars 18 and spaced therefrom by other collars 19, are hubs 20 of spiders 21. These hubs 20 have their inner portions inside the spiders disposed in abutting relation and rotatably mounted thereon are opposed bevel gear wheels 22 provided with peripheral rims 23 extending on the opposite sides to the bevel teeth 24 of said wheels. A countershaft 25, journaled longitudinally in the frame of the bed, is provided at its front end with a bevel gear 26 meshing with a gear 27 that is carried by the loose pulley 9, while the rear end of said shaft carries another bevel gear 28 that meshes with the teeth 24 of the opposed gear wheels 22. It will thus be evident that if the belt 5 is shifted to the loose pulley 9, the gear wheels 22 will be revolved in opposite directions by the power transmitted through the countershaft 25 and gear wheel 28. In order that the power thus transmitted to the gear wheels 22 may in turn be transmitted from either of said gear wheels to the rear shaft or axle 10 carrying the drive wheels 13, the following mechanism is preferably employed. A plurality of radially movable shoes 29 are carried by stems 30 that are slidably mounted in bearings 31 on the arms of the spiders 21, and the inner ends of the stems 30 are connected to toggle links 32, which are pivoted to ears 33, formed at the juncture of the hubs 20 and the spiders 21. Grooved collars 34 are keyed to and slidable upon the outer ends of the hubs 20 of the spiders 21, and have link connections 35 with the toggle links 32. A guide bracket 36 is secured upon the frame of the machine, as shown in Figs. 2, 7 and 12, and is provided with a longitudinal slot 37 disposed above and longitudinally of the axle 10. In this slot are slidably mounted the depending arms 38 of a shifting stirrup 39, and said arms have at their lower ends, yokes 40, which engage in the grooves of the collars 34. The upper cross bar of the stirrup 39 is provided in its underside with notches, in which are rotatably mounted the axles 41 of rollers 42 that ride upon the bracket 36 on opposite sides of the slot 37. The central portion of the cross bar of the stirrup 36 is provided with a stud 43 engaged by one arm of a bell crank lever 44, the other arm having a link connection 45 with a controlling or shifting lever 46, suitably fulcrumed on the front portion of the machine and having a dog 47 coacting with racks 48 disposed on opposite sides of the lever, as will be evident by reference to Figs. 1 and 2.

Means are provided for shifting the belt 5 from the tight pulley 8 to the loose pulley 9, or vice versa, said means also constituting a belt tightener. This means is disclosed in Figs. 2, 44 and 45. It will be seen by reference to said figures that on the cross sill of the bed-frame are secured guide brackets 49, in which is slidably mounted a vertically movable yoke frame 50 that can be held in different positions by spring pins 51 slidably mounted on the brackets 49 and arranged to engage in any of a series of openings 52 formed in each of the vertical arms of the yoke frame. The lower ends of said vertical arms are connected by a bolt 53, on which is journaled an idler 54, over which the lower stretch of the belt 5 passes. A lever 55, fulcrumed between its ends on the upper portion of the yoke frame, carries a dog 56 that coöperates with a rack 57 secured to said frame. The lower end of the lever is bifurcated, as shown at 58, and engages in a groove 59 formed in the hub of the idler. It will thus be evident that by swinging the lever 55, the idler 54 will be moved longitudinally of the bolt 53, and thus the belt 5, shifted transversely. Furthermore by raising the frame 50, the idler will be elevated, and consequently the belt tightened.

From the above, it will be clear that if the engine is in operation, and the belt 5 is shifted to the loose pulley 9, the countershaft 25 will be driven, thus driving the wheels 22 in opposite directions. Therefore if the lever 46 is moved in one direction or the other, the stirrup frame 39 will be moved, and as a result, one of the sets of clutch shoes 29 will be thrown into engagement with one of the wheels 22, while the other will be moved to an inoperative position. Therefore the machine may be propelled in either direction, inasmuch as the shaft 10 of the drive wheels 13 can be operated in either direction desired. Moreover, it will be observed in this connection that the full power of the engine will be transmitted to the driving mechanism.

The channel bar constituting the front end of the frame is curved, as shown at 60, and located therein is the lower end of a tubular base 61, said base having an outstanding annular flange 62 that rests upon the channel bar 60, and is bolted thereto, as shown at 63. The upper end of the base 61 constitutes a track on which is rotatably mounted a turntable 64, tapered roller bearings 65 being interposed between the turntable and track, as shown in Figs. 13, 14 and 18. The turntable is provided with depending inner and outer flanges 66 that inclose the rollers 65 and embrace the upper end of each track of the base 61.

The following mechanism is preferably employed for rotating the turntable 64 in opposite directions. Upper and lower revoluble bands 67 surround the base 61, and have bevel teeth 68 in their opposed edges. These bands are supported as shown in Figs. 13 and 19 by wheels 69 journaled thereon as shown at 70, in Fig. 19, said wheels running on tracks 71 formed by flanges on the periphery of the tubular base. A countershaft 72 is journaled in the rear side of said tubular base, and has at its rear end a bevel gear 73 meshing with another bevel gear 74 fixed to the main driving shaft 4. Therefore the countershaft 72 will be revolved when the belt is in operation on the fixed pulley 8. Said countershaft 72 is furthermore provided with another bevel gear 75, which is in mesh with the teeth 68 of the bands 67, as shown in Figs. 2 and 13. Thus said bands will be rotated in opposite directions.

The turntable 64 carries at one side a depending bracket 76, and fulcrumed between its ends on the lower end of said bracket is a lever 77. The lever is provided above and below the fulcrum, which is designated 78, with brake or clamping shoes 79 pivoted thereto and coöperating respectively with the exterior faces of the bands 67. The upper shoe is slidably mounted on a lug 80 carried by the bracket 76, while the lower shoe is suspended from the upper shoe by links, one of which is shown at 81 in Fig. 13. The upper end of the lever 77 has a link connection 82 with the crank arm 83 of a rock shaft 84 journaled on a bracket 85 on the turntable, and said rock shaft carries an upstanding crank arm 86 having a link connection 87 with an actuating lever 88 fulcrumed at its lower end, as shown at 89 on the turntable, and having a dog 90 coöperating with a rack 91 mounted on the turntable. The lever 88 is disposed in convenient relation to a seat 92 for an operator, said seat being fixed to the turntable.

From the above, it will be evident that if the driving shaft 4 is in operation, the bands 67 will be rotated in opposite directions. Therefore if the operator swings the lever 85 in one direction or the other, one or the other of the shoes 79 will be swung into clamping engagement with one of said bands. As a result the turntable 64 will be fixed to said band, and consequently said turntable can be rotated in either direction by the proper operation of the lever 88.

The above described turntable constitutes a support for a mast and boom, and for this purpose, said turntable is provided with spaced upstanding brackets 93, to which is secured a forwardly and upwardly inclined mast 94 shown in Fig. 1. This mast is preferably formed of spaced channel bars with the flanges turned inwardly, as shown in Fig. 3, and it has an upper journal bearing in the roof of the cab. To this end, a strong supporting beam 95 is located in said roof, and is provided with a boxing 96 in which is rotatably mounted a vertical tubular spindle 97, the axis thereof being coincident with the axis of rotation of the turntable. Rollers 98 are preferably provided for the bearing. Arms 99, strapped as shown at 100 to the upper and lower ends of the spindle 97 above and below the beam 95 and boxing 96, have their outer ends suitably secured, as shown at 101 to the mast. The boom, designated as a whole by the reference numeral 102, is pivotally supported at the lower end of the mast, and comprises spaced side bars or beams 103 carrying at their outer ends a supporting frame that consists of standards 104 connected by longitudinal bars 105, and braced as shown at 106. A chain or cable 107 is secured to the rear upper corner of the supporting frame, and passes over a pulley or sheave 108 journaled in a bracket 109 that is carried by the upper end of the mast 94. This chain or cable 107 is secured to an endless chain or cable 110 that extends longitudinally of the mast 94, and has its upper end passing around a crown pulley or sheave 111 journaled in the bracket 109, the bearing for said pulley being preferably a flanged sleeve 112 mounted on a bolt 113, as shown in Fig. 4. The lower end of the chain or cable 110 passes about a sheave 114 that is secured to the hub 115 of a carrier 116. A bevel gear wheel 117 is journaled on said hub, as shown in Fig. 14, and is provided with a peripheral rim 118 with which a series of shoes 119 coöperate, said shoes having stems 120 slidably mounted in the carrier 116. The stems 120 have connected thereto, toggle links 121 connected with a shifting collar 122 which is operated by a horizontally disposed lever 123, shown in Figs. 2, 15 and 16. It will thus be evident that by shifting the lever 123, the shoes 119 can be engaged with the gear wheel 117 so that the sheave 114 will be clutched to said gear wheel, and the two will, of necessity, rotate together. The stems 120 of the shoes 119 are maintained in place on the carrier 116 by means of a ratchet wheel 124 shown in Figs. 14 and 16. Coöperating with the teeth of this ratchet wheel, is a spring pressed holding dog 125 having a connection with a bell crank lever 126, one arm of which is provided with a foot-piece 127. The gear wheel 117 is in mesh with a pinion 128 carried by the upper end of a stub shaft 129 journaled centrally in the turntable 64 and carrying at its lower end a large bevel gear wheel 130 that is located in the tubular base 61. The gear wheel 130, as shown in Fig. 13, is in mesh with a bevel pinion 131 carried by the inner end of the countershaft 72. Therefore if said countershaft 72 is in motion, the gear wheel 130 will be revolved, thereby revolving the shaft 129, the pinion 128, and consequently the gear wheel 117. It will thus be evident that if the gear wheel 117 is in operation, the sheave 114 may be clutched thereto, and when so clutched, the chain 110 will be moved so that the stretch thereof to which the chain 107 is connected, will be drawn downwardly, thus elevating the boom 102. Its retrograde movement, when unclutched, is prevented by the dog 125 engaging the teeth of the ratchet wheel 124, and by releasing said dog, the boom 102 will drop by its own weight. The rapidity of such movement is readily controlled by the lever 123, for it will be evident that the shoes 119 can be used to act as a brake against the too rapid retrograde rotation of the sheave 114.

Mounted on the outer end of the boom 102 is a shovel, carrier, or material-holding means. In the present embodiment, the same is in effect a grated shovel comprising a bottom and side walls composed of spaced rods or bars 132 secured at their ends to frame-pieces 133. A lining as 132ª, see Fig. 52 may be employed, and is detachably located in the shovel when the shovel or holder is used in moving dirt, sand or other loose substance. The front end of the shovel or holder is open and tapered, as illustrated in Figs. 1 and 35, while the rear end is normally closed by a swinging gate 134 controlled by a spring latch 135 mounted on the gate and engaging in a keeper 136, as shown in Figs. 35 and 40. The latch 135 has a connection with a bell crank lever 137, to which may be attached an actuating cord 138. The bucket or holder furthermore is provided with a hanger composed of straps 139 disposed in braced relation, and having their free ends connected as shown at 140. A link 141, shown in Figs. 1, 25 and 53 is pivoted to the front upper corner of the supporting frame 104—105, that is carried by the outer end of the boom 102. The lower end of this link is in the form of a hook 141ª that engages over the end 140 of the hanger. A latch 141ᵇ comprises spaced leaves that embrace the hook 141ª, and are pivoted thereto as shown at 141ᶜ. This latch is arranged to move across the open mouth of the hook, and is urged to its closed position by springs 141ᵈ. The leaves of the latch are provided with outstanding projections 141ᵉ that are arranged to ride upon the beveled ends 141ᶠ on the ends of the bars 103. Said outstanding projections engage in notches 141ᵍ formed in the beveled ends. The end 140 of the hanger is furthermore provided with a transversely disposed axle, on the ends of which are journaled rollers 140ª, and these rollers are arranged to run upon the tracks, as hereinafter set forth. Certain of the straps 139 are continued rearwardly and upwardly from the bucket or holder, and are provided with an eye 142 pivotally connected to the depending ears 143 of a carriage, designated as a whole by the reference numeral 144, which carriage is movable longitudinally on the boom, as hereinafter explained.

Extending longitudinally of the boom 102 is an endless chain 145, which passes at its outer end around a sheave 146 suitably journaled on the outer end of the boom and passes at the inner end of the boom around a sheave 147 that is secured to a bevel gear 148 loosely journaled on the bolt 149 carrying the operating means for the chain 110. The bevel gear 148 is driven by the pinion 128 carried by the upper end of the stub shaft 129, as already described. Thus as long as said stub-shaft 129 is in motion, the gear wheel 148 will be revolved, and consequently the chain 145 will be in constant movement.

The carriage 144, to which reference has already been made, consists of two sections 150 and 151, suitably secured together and supporting upper and lower axles 152 on which are journaled upper and lower sets of wheels 153, the upper set running on the upper edge of the side members 103 of the boom, the lower set operating on tracks 154 formed by the inturned flanges of plates 155 secured to the side members 103 of the boom. The carriage is provided with suitable passageways 156, through which the upper and lower stretches of the chain 145 pass, as shown in Figs. 30, 31 and 32. One of the sections 151 of the carriage is cut out, as shown at 157, and pivotally mounted therein, is a clutch comprising angularly disposed jaws 158, carried by a tubular gudgeon 159 that is journaled between the sections 150 and 151 of the carriage. The gudgeon 159 is provided with a rearwardly extending lug 160 having its free end disposed adjacent to the inside of one of the side members 103 of the boom, as shown in Fig. 32. The ends of the jaws are provided with seats 161ª to receive the links of the chain 145, and said jaws are arranged to clamp against the chains and force them into engagement with the carriage section 150, as hereinafter set forth.

Extending longitudinally between the side members 103 of the boom, is a rock-shaft 161 suitably journaled therein, as shown at 162, and passing through the tubular gudgeon 159. This shaft 161 is provided in opposite sides with longitudinal key-ways 163, which, while disposed in opposite sides, are not diametrically opposite, as will be noted by reference to Figs. 30 and 32. The lower or inner end of the shaft 161 is provided with a segmental gear 164, and meshing therewith is another segmental gear 165 carried by a shaft 166 that also carries a crank arm 167, these parts being shown in Figs. 23 and 24. A link 168, connected to the crank arm 167, has a connection with an operating lever 169, suitably fulcrumed upon a bracket 170, carried by the inner end of the boom, the lever being disposed in convenient relation to the operator upon the seat 92. It will thus be evident that by swinging the lever 169, the shaft may be partially rotated in either direction. Now by referring to Figs. 29 and 32, it will be seen that the clutch lever 158 carries a pair of pivoted dogs 171 having teeth 172 that pass through the tubular gudgeon 159, and are movable into the longitudinal key-ways 163. However, when one of said teeth are in its key-way, the other is out of the same, as shown in Fig. 32, but said teeth are urged towards the shaft by springs 173, interposed between their outer ends. A rib 174, carried by the tubular gudgeon is disposed between the pivoted portions of the dogs 171, and serves to limit their inward movement. It will be observed by reference to Fig. 32, that even when the tooth of the lower dog 171 is in its key-way 163, the lower jaw 158 of the clutch will be out of coaction with the chain.

The tails or outer ends of the dog 171 project beyond the carriage, as shown in Figs. 30 and 31, and disposed in the path of movement of each tail are trips illustrated in Figs. 25, 26 and 27. As therein disclosed, said trips comprise hooks 175, having seats 176, and mounted on swinging arms 177 that are pivoted on one of the side members 103, the hooks being yieldingly and normally held in lowered relation by springs 178. As shown in Fig. 25, these trips are disposed in opposite relation, and they are so arranged that the outer one will engage one of the dogs 171, while the inner trip will engage the other. Mounted on the other member 103, and directly opposite to the outer trip is a locking device, shown in detail in Fig. 28. As therein disclosed, this locking device consists of a hook 179 pivoted between its ends, as shown at 180, the bill 181 being forced downwardly by a spring 182. A swinging arm 183, pivoted on the side member 103 at one end, and as shown at 184, has its other end upturned and pivotally connected as shown at 185 to the end of the hook 179 opposite the bill 181. With this hook, the lug 160 coöperates, as hereinafter explained.

The operation of the carriage may be briefly described as follows. Remembering that the chain 145 is in continuous operation, it will of course be evident that the upper and lower stretches are moving in opposite directions. Moreover, as the boom is pivoted on the ends of the bolt 149 on which the wheel 147 is journaled, the upright swinging movement of the boom will not affect the said chain in its movements. As long as the clutch arms 158 are disposed in the relation shown in Fig. 32, the chain can move freely through the carriage, and said carriage will therefore be at a standstill. If, now, the lever 169 is moved in one direction, it will be evident that the rock shaft 161 will be turned. As the lower tooth 172 is in lower key-way 163, the lower jaw 158 will be swung so as to clamp against the lower stretch of the chain. Therefore, if this stretch is moving toward the outer end of the boom, the carriage will be moved with it in a corresponding direction. This movement of the carriage will continue until the tail of the dog 171 moves into the seat 176 of the hook 175 of the trip. A continued movement causes said hook to swing with the link 177, and said link therefore raises the hook. This movement will cause the dog 171 to swing upon its pivot, and carry the tooth 172 out of the key-way 163 of the rock shaft 161. The dog 171 strikes the rib 174, and will cause the rotation of the clutch, and therefore free the same from the chain, which continues to operate. The movement of the clutch is continued until the tooth of the upper dog 171 is engaged in the upper key-way 163, but at this point, the upper jaw 158 will still be out of coaction with the upper stretch of the chain, or in other words, will be just the reverse of that shown in Fig. 32. At the completion of the outward movement of the carriage, the lug 160 rides under the bill of the locking hook 181 and engages in the lock, as shown in Fig. 28, said view being a reverse view from that shown in the plan in Fig. 26. The carriage is now in its outermost position at which stage the nose of the shovel will be elevated, as shown in Fig. 1. To reverse the movement of the carriage, or in other words, carry it toward the inner end of the boom, and thereby depress the nose or open end of the carriage, a reverse swinging movement of the lever 169 is all that is necessary, for upon said reverse movement, the shaft 161 will be turned so as to carry the upper jaw 158 into coaction with the upper stretch of the chain, it being remembered that the tooth 172 of the upper dog 171 is now in the upper key-way 163. This forced swinging movement of the clutch will of course result in the rotation of the gudgeon 159 of said clutch, consequently the lug 160 will be swung, pressing upon the lower arm 183, and thereby raising the bill of the hook 181 until it is freed from the lug. The carriage therefore will be free of the lock and will be clamped to the opposite moving stretch of the chain or cable, so that it will be moved downwardly until the tail of the upper dog 171 strikes the lower trip, which will reverse the parts, and leave them again in the position shown in Fig. 32, at which position the parts were assumed to be, at the beginning of the description of the operation. In this connection, it will be observed that by operating the lever 169, the carriage can be unclutched from either stretch of the chain or cable at any point desired. During the back and forth movement of the carriage 144, it will be observed that the link 141 will be swung, but when the carriage is moving rearwardly or toward the inner end of the boom, it will be noted by reference particularly to Fig. 25 that the hooked end of the link will swing between the tracks 155. Therefore the outstanding projections 141$^e$ of the latch will ride up the inclined edges 141$^f$ of said track, and engage in the notches 141$^g$. The hanger will consequently be released, and the rollers 140$^a$ will run rearwardly upon the tracks. When a reverse movement takes place, the parts will reëngage and the link will swing outward, as will be obvious. Thus, it will be seen that means are provided for raising and lowering the boom and for elevating and dumping the shovel or carrier upon said boom, all of said means being controlled by simple levers in convenient relation to the operator, all of said mechanism being mounted on a turntable, and furthermore all being driven from the single shaft 4.

Means also are provided directly below the turn-table and the operating mechanism above described for guiding the machine in its movement. This means is disclosed more particularly in Figs. 1, 2, 14, 20, 21 and 22. The tubular base 61 already described as secured to the curved sills 60, has an internal annular flange 186 constituting a track. Radially disposed arms are located within the lower portion of the base 161, the same comprising a continuous axle 187 and another axle comprising sections 188 disposed at right angles to the axle 187. These axles have their intermediate portions located within a keeper 189, and the inner ends of the sections 188 are disposed on opposite sides of the central portion of the axle 187. A cap 190 is disposed thereover, and is secured to the keeper by bolts 191. The sections 188 are furthermore connected by a tie device 192 that bridges the axle 187, and has downturned terminals engaged in the sections 188. These axles carry at their outer ends flanged wheels 193, which, as shown in Figs. 13 and 14 operate against the underside of the track 186, thereby forming in effect a fifth wheel. The keeper 189 is provided with depending spaced ears 194, between which extends the front axle 195 of the machine, said axle having a central enlargement 196, through which passes a pivot bolt 197 that also passes through the depending ears 194. On the ends of the axle 195 are journaled the front ground wheels 198 of the machine, the ends of the axle 195 being connected by a cable or chain 199, which passes around a guide sheave 200, journaled on the front end of the frame, while another chain or cable 201 having its ends connected to the ends of the axle 195, passes about a sheave or pulley 202 carried by the lower end of an upright shaft 203, suitably journaled in the frame and having a hand wheel 204 on its upper end. This shaft, as shown in Figs. 41 and 42 is provided contiguous to the floor of the cab with a tooth wheel 205, and coöperating with the teeth of said wheel, is a tooth 206 of a pivoted dog 207. This dog is pivotally mounted between its ends, one end being provided with a foot-piece 208, the other end being provided with a weight 209. The dog is shown in detail in Fig. 43. With this construction, it will be evident that as long as the tooth 206 of the dog 207 is engaged between adjacent teeth of the wheel 205, the shaft 203 will be held against rotation, but if said wheel is released by pressing upon the foot-piece 208 of the dog, the shaft 203 will be free and can be revolved by means of the hand wheel 204, thus turning the axle for the purpose of steering the machine. The pressure upon the foot-piece being relieved, however, the weight 209 will cause the tooth 206 of said dog to again engage between the teeth of the wheel 205 and lock it, and consequently the wheels in their adjusted relation.

For the purpose of unclutching either or both of the driving wheels 13 from the driving axle or shaft 10, the following mechanism is preferably employed. The inner end of the hub of each wheel 13 is provided with a series of radial seats 210, shown more particularly in Fig. 47, and the enlarged ends 15 of the associated sleeves 14 have pivoted thereto, dogs 211 that are movable into and out of the seats. These dogs are actuated by rings 212 that surround outstanding projections 213 on the pivoted ends of the dogs, said projections being engaged in annular grooves 214 formed in the inner sides of the rings. The rings 212 are connected to stems 215 that are slidable in the frame of the machine longitudinally of the driving axle or shaft 10, and the inner ends of these stems are connected to the rearwardly extending arms 216 of bell crank levers 217. The other arms 218 of the bell crank levers have their free ends pivotally connected to sliding blocks 219 mounted in yokes 220, and these yokes have link connections 221 with the lower ends of actuating levers 222, said levers being fulcrumed between their ends, as shown at 223, and carrying dogs 224 coöperating with holding quadrants 225. The blocks 219 are normally and yieldingly maintained in the rear ends of the yokes 220 by springs 226 that are located longitudinally in the yokes, the rear ends of the springs bearing against the blocks 219, and being held from detachment by studs 227. Other studs 228, located in the front portions of the yokes, serve to prevent the detachment of the front ends of the springs. With this construction, when the levers 222 are in their foremost positions, the rings 212 will be in their outermost positions, in which case, the dogs will be swung inwardly, and their outer ends will be engaged in the seats 210 of the wheel hubs. Therefore the wheels will be fixed to the shaft or axle 10. If now, it is desired to free either or both of the wheels from said shaft, it is only necessary to draw the lever or levers 222 rearwardly, in which case, the inner arms 218 of the bell crank levers will be swung forwardly, the stems 215 will be moved inwardly, and the rings 212 correspondingly moved. This will cause the dogs to swing out of the seats. If the levers are thrown forwardly, the dogs will be returned and in case the seats 210 are not in position to receive the dogs, the springs 223 will yield sufficiently to avoid breakage of the parts, and as soon as the seats 210 aline with the dogs, said springs will operate to move them into the seats.

From the foregoing, it is thought that the construction, operation, and many advantages of the herein described invention, will be apparent to those skilled in the art, without further description, and it will be understood that various changes in the size, shape, proportion, and minor details or construction, may be resorted to without departing from the spirit or sacrificing any of the advantages of the invention.

Having thus fully described my invention, what I claim as new, and desire to secure by Letters Patent, is:—

1. In a machine of the character set forth, the combination with a support, of a base mounted thereon, a carrier rotatably mounted on the base, and means movably mounted on the base for rotating the carrier.

2. In a machine of the character set forth, the combination with a rotatable turntable, of a revoluble member for rotating the same, means for continuously revolving said member, and means for connecting the turntable thereto.

3. In a machine of the character set forth, the combination with a turntable, of a revoluble member for rotating the same, means for continuously revolving said member, and means mounted on the turntable for connecting the same to the revoluble member.

4. In a machine of the character set forth, the combination with a turntable, of an operating member for the turntable revoluble independently of said turntable, means for revolving the member, and means for securing the turntable and member against relative rotation.

5. In a machine of the character set forth, the combination with a turntable, of an operating member for the turntable revoluble independently of said turntable, means for revolving the member, and a clutch shoe mounted on the turntable and movable into engagement with the member to connect the turntable and member.

6. In a machine of the character set forth, the combination with a turntable, of a revoluble operating member therefor having its axis of rotation substantially coincident with that of the turntable, means for revolving the member, and means for detachably connecting the turntable and member.

7. In a machine of the character set forth, the combination with a turntable, of an independently revoluble operating member therefor having an upright axis of rotation, and being disposed below the turntable, means for revolving the member, and means for detachably securing the turntable and member against relative movement.

8. In a machine of the character set forth, the combination with a turntable, of a revoluble band, and a clutch device for securing the band and turntable together.

9. In a machine of the character set forth, the combination with a base, of a turntable rotatably mounted on the base, a revoluble operating member mounted on the base and movable independently of the turntable, means for revolving the member, and means for securing the turntable and member against relative movement.

10. In a machine of the character set forth, the combination with a base, of a turntable rotatably mounted on the base, a revoluble operating band surrounding the base and movable independently of the turntable, and means for securing the turntable to the band.

11. In a machine of the character set forth, the combination with a base, of a turntable rotatably mounted on the base, a revoluble operating band surrounding the base and movable independently of the turntable, and a clutch shoe mounted on one and engaging the other for securing the turntable to the band.

12. In a machine of the character set forth, the combination with a base, of a turntable rotatably mounted on the base, a revoluble operating band surrounding the base and movable independently of the turntable, a clutch shoe movably mounted on the turntable and movable into engagement with the band, and means mounted on the turntable for moving the shoe.

13. In a machine of the character set forth, the combination with a base, of a turntable mounted on the upper portion thereof, a band surrounding the base and revoluble independently of the turntable, means for revolving the band, a swinging clutch shoe mounted on the turntable and movable into engagement with the band to secure the turntable thereto, an operating lever fulcrumed on the turntable, and connections between said lever and the shoe.

14. In a machine of the character set forth, the combination with a base, of a turntable rotatably mounted on the upper portion thereof, a band surrounding the base and revoluble independently of the turntable, said band having gear teeth, means mounted on the turntable for connecting said turntable to the band, a shaft journaled in the base, means for rotating the shaft, and a gear wheel carried by said shaft and meshing with the teeth of the band.

15. In a machine of the character set forth, the combination with a base, of a turntable rotatably mounted thereon, said base having a track, a revoluble operating band having bearings on the track, means for revolving the band, and means for connecting the turntable to the band.

16. In a machine of the character set forth, the combination with a base, of a turntable rotatably mounted thereon, said base having an annular track, a revoluble band surrounding the base, wheels carried by the band and operating on the track, means engaging the band for revolving the same, and means for clutching the turntable and band together.

17. In a machine of the character set forth, the combination with a supporting frame, of a base secured thereon and having an annular track, a rotatable turntable mounted on the upper end of the base and having a roller bearing thereon, an operating band surrounding the base below the turntable and having wheels running on the track of the base, a swinging clutch shoe mounted on the turntable and movable into and out of engagement with the band, an operating lever fulcrumed on the turntable and having connections with the shoe to move the same, teeth formed upon one edge of the band, a shaft journaled on the base, and a gear wheel carried by the shaft and meshing with the teeth of the band.

18. In a machine of the character set forth, the combination with a rotatable carrier, of oppositely revoluble operating members therefor, means for connecting the rotatable carrier to the members, and means for revolving said members in opposite directions.

19. In a machine of the character set forth, the combination with a rotatable carrier, of oppositely revolving operating means therefor, and means for connecting the rotatable carrier to either member.

20. In a machine of the character set forth, the combination with a rotatable turntable, of oppositely revoluble operating members therefor having their axes of revolution substantially coincident with the axis of rotation of the turntable, and means for connecting the turntable to either member.

21. In a machine of the character set forth, the combination with a rotatable turntable, of oppositely revoluble operating members therefor located below the turntable, means for revolving the members simultaneously in opposite directions, and means for connecting the turntable to either member.

22. In a machine of the character set forth, the combination with a base, of a turntable rotatably mounted thereon, bands surrounding the base, means for revolving the bands in opposite directions, and means for connecting the turntable to either band.

23. In a machine of the character set forth, the combination with a base, having annular tracks, of a turntable rotatably mounted on the base, bands surrounding the base, rollers carried by the bands and operating respectively on the different tracks, means for revolving the bands in opposite directions, and means for clutching the turntable to either band.

24. In a machine of the character set forth, the combination with a base, of a turntable rotatable thereon, bands surrounding the base and having gear teeth on their opposed edges, a gear interposed between the bands and meshing with the teeth thereof, and means for clutching the turntable to either band.

25. In a machine of the character set forth, the combination with a base, of a turntable rotatable thereon, bands surrounding the base, means for simultaneously revolving the bands in opposite directions, clutch shoes mounted on the turntable, and means for engaging one of said shoes with either band.

26. In a machine of the character set forth, the combination with a base, of a turntable rotatably mounted thereon, bands revolubly mounted on the base below the turntable, means for simultaneously revolving said bands in opposite directions, a lever fulcrumed between its ends on the turntable, shoes carried by the lever on opposite sides of its fulcrum and coacting respectively with the bands, and an operating lever fulcrumed on the turntable and having connections with the shoe-carrying lever for operating the same.

27. In a machine of the character set forth, the combination with a machine frame, of a tubular base mounted thereon, a turntable rotatably mounted on the upper end of the base and having a roller bearing thereon, said base being provided with upper and lower annular tracks, operating bands surrounding the base and having rollers running on said tracks, said bands being provided in their opposed edges with gear teeth, a shaft journaled in the base, means for rotating the shaft, a gear wheel carried by said shaft and meshing with the teeth of the bands, a depending bracket carried by the turntable, a lever fulcrumed between its ends on said bracket, shoes carried by the lever and coöperating respectively with the bands, an operating lever fulcrumed on the turntable, and connections between said operating lever and the shoe-carrying lever for swinging the same upon the swinging of the operating lever.

28. In a machine of the character set forth, the combination with supporting means, of a mast having a rotatable base, an upright spindle located above the base and having a bearing between its ends, and arms separately secured to the spindle above and below the bearings, said arms being separately connected to the mast.

29. In a machine of the character set forth, the combination with a bed frame, of a cab mounted thereon and having a roof, a mast having a rotatable support on the bed frame, an upright spindle having a bearing in the roof of the cab, and arms secured to the spindle above and below the roof, said arms being separately connected to different portions of the mast.

30. In a machine of the character set forth, the combination with supporting means, of a mast having a rotatable base, a substantially horizontal beam mounted above the base and including an upright boxing, an upright spindle having a roller bearing in the boxing; and separate connections between the spindle and mast.

31. In a machine of the character described, the combination with a rotatable support, of a mast mounted thereon, a boom pivotally mounted on the support, and means connecting the mast and boom for swinging the latter.

32. In a machine of the character set forth, the combination with a bed-frame, of a turntable rotatable thereon, a mast fixed to the turntable, a boom having its inner end pivoted on the turntable, and means connecting the mast and boom for swinging the latter.

33. In a machine of the character set forth, the combination with a mast, of a movable boom associated therewith, an operating member for the boom mounted on and movable longitudinally of the mast, and a connection between said member and boom.

34. In a machine of the character set forth, the combination with a mast, of a movable boom associated therewith, an operating cable for the boom mounted on and having a portion movable longitudinally of the mast, and a flexible connection between said cable and boom.

35. In a machine of the character set forth, the combination with a mast, of a boom associated therewith, sheaves journaled on the end portions of the mast, an operating cable passing around the sheave, another sheave journaled on the upper portion of the mast, and a cable connected to the boom, passing over the latter sheave and connected to the operating cable.

36. In a machine of the character described, the combination with a movable boom, of means for moving the same, said means including a rotatable sheave, an endless cable passing about the same, a connection between the cable and boom, driving means, and mechanism for clutching the driving means and the sheave together.

37. In a machine of the character described, the combination with a movable boom, of means for moving the same, said means including a rotatable sheave, an endless cable passing about the sheave, a connection between the cable and boom, a rotary driving member associated with the sheave, said sheave and member having coincident axes of rotation, and mechanism for clutching the driving member and sheave together.

38. In a machine of the character described, the combination with a movable boom, of means for moving the same including a cable and a rotatable device that the cable passes around, a connection between the cable and boom, a driving member, means for clutching the driving member and rotatable device together to move the latter in one direction, and means for holding the device against rotation in an opposite direction when unclutched from the driving member.

39. In a machine of the character set forth, the combination with a movable boom, of means for moving the same including a cable and a rotatable device that the cable passes around, a connection between the cable and boom, a driving member, means for clutching the driving member and rotatable device together to move the latter in one direction, a ratchet wheel rotatable with the device, and a dog coöperating with the ratchet wheel for holding the device against rotation in an opposite direction when unclutched from the driving member.

40. In a machine of the character set forth, the combination with a movable boom, of means for moving the same including a sheave, an endless cable passing about the sheave, a cable connection between the cable and boom, a driving wheel, means for clutching the driving wheel and sheave together to move the latter in one direction, a ratchet wheel connected to the sheave, and a dog coöperating with the ratchet wheel, to prevent the retrograde rotation of the sheave when unclutched from the driving wheel.

41. In a machine of the character set forth, the combination with a mast, of sheaves mounted on the upper and lower portions thereof, an endless cable passing about the sheaves, a swinging boom, a cable connection between the swinging boom and one of the stretches of the endless cable, a driving wheel loosely associated with the lower sheave and having a rim, clutch mechanism connected to the sheave and movable into and out of engagement with the rim, and a lever for operating the clutch mechanism.

42. In a machine of the character set forth, the combination with a mast, of upper and lower sheaves journaled thereon, an endless operating cable passing around the sheave, a swinging boom having one end pivotally associated with the mast, a cable connection between the boom and the operating cable, a hub carried by the lower sheave, a driving wheel loosely journaled on the hub, clutch mechanism carried by the hub and movable into and out of engagement with the driving wheel to clutch the sheave thereto, a ratchet wheel rotatable with the sheave, and a dog associated with the ratchet wheel for normally preventing the rotation of the sheave in one direction when unclutched from the driving wheel.

43. In a machine of the character set forth, the combination with a turntable, of a boom movably associated therewith, operating means for the boom mounted on the turntable, driving means having a member mounted on the turntable, and means mounted on the turntable for connecting and disconnecting the operating means and driving member.

44. In a machine of the character set forth, the combination with a support, of a turntable rotatable thereon, a motor mounted on the support, a driving member mounted on the turntable and operated from the motor, a boom movably associated with the turntable, operating means for the boom mounted on the turntable, and clutch mechanism mounted on the turntable for connecting the driving member and boom operating means.

45. In a machine of the character set forth, the combination with a support, of a turntable mounted thereon, a driving shaft journaled on the support, a shaft journaled centrally of the turntable, connections between the shafts, a boom movably associated with the turntable, and operating means for the boom driven from the turntable shaft.

46. In a machine of the character set forth, the combination with a support, of a turntable mounted thereon, a driving shaft journaled on the support, an upright shaft journaled on the turntable, driving connections between the shafts, a boom movably associated with the turntable, and operating means for the boom driven from and having a clutch connection with the upright shaft.

47. In a machine of the character set forth, the combination with a support, of a turntable mounted thereon, a driving shaft journaled on the support, an upright shaft journaled on the turntable, driving connections between the shafts, a swinging boom carried by the turntable, operating means for the boom mounted on the turntable and connected to said boom, said means including clutch mechanism that is mounted on the turntable and is geared to the upright shaft.

48. In a machine of the character set forth, the combination with a turntable, of a mast mounted thereon, a swinging boom also carried by the turntable, a sheave journaled on the lower end of the mast, a cable passing around the sheave and having a connection with the cable and boom, an upright shaft journaled on the turntable, means for driving the shaft, a wheel geared to the shaft and associated with the sheave, and clutch mechanism for connecting said wheel and sheave.

49. In a machine of the character set forth, the combination with a turntable, of a mast mounted thereon, a swinging boom associated with the mast, upper and lower sheaves journaled on the mast, an endless cable passing around the sheaves, another sheave journaled on the upper end of the mast, a cable passing over said sheave and connected to the boom and to the endless cable, an upright shaft journaled centrally of the turntable, means for rotating the same, a driving wheel geared to said shaft and loosely associated with the lower sheave, clutch mechanism for connecting said sheave and driving wheel, a ratchet wheel rotatable with the sheave, and a dog for holding the ratchet wheel against movement in one direction when the sheave is unclutched from the driving wheel.

50. In a machine of the character set forth, the combination with a support, of a base secured to the support, a turntable rotatably mounted on the base, oppositely rotatable bands mounted on the base, clutch shoes carried by the turntable and movable into coaction with the bands for rotating the turntable in opposite directions, a driving shaft journaled on the support, a countershaft journaled on the base and geared to the bands for rotating them in opposite directions, a mast carried by the turntable, a swinging boom associated with the mast, upper and lower sheaves carried by the mast, an endless operating cable passing around the sheaves, a connection between the cable and boom, an upright shaft journaled centrally of the turntable and geared to the countershaft, a driving wheel geared to said upright shaft and loosely associated with the lower sheave, clutch mechanism for connecting the lower sheave and driving wheel, and means for holding the lower sheave against retrograde movement when unclutched from the driving wheel.

51. In a machine of the character set forth, the combination with a support, of material-holding means movably associated therewith, a plurality of connections between the holding means and support, said connections being relatively movable on the support, and means for effecting their relative movement to tilt the holding means.

52. In a machine of the character set forth, the combination with a support, of material-holding means movably associated therewith, a swinging connection between the holding means and support, and means for moving the holding means longitudinally on the support to cause the swinging movement of said connection.

53. In a machine of the character set forth, the combination with a support, of material-holding means movably associated therewith, a swinging connection between the holding means and support, another connection between the holding means and support that is movable longitudinally of the latter, and mechanism for effecting said longitudinal movement and thereby the swinging of the first mentioned connection.

54. In a machine of the character set forth, the combination with a supporting boom, of a shovel associated therewith, a swinging link connection between the shovel and boom, and means for moving the shovel longitudinally of the boom to thereby cause the swinging of the link.

55. In a machine of the character set forth, the combination with a supporting boom, of a shovel associated therewith, a swinging link connection between the shovel and boom, and a carriage movable longitudinally on the boom and connected to the shovel.

56. In a machine of the character set forth, the combination with a supporting boom, of a shovel, a swinging link pivotally connected to the boom and to the shovel, a carriage movable longitudinally on the boom, said carriage having a pivotal connection with the shovel, and means for moving the carriage.

57. In a machine of the character set forth, the combination with a supporting boom, of a shovel having an open front end, a link pivotally connected to said front end and pivotally connected to the boom, a carriage movable longitudinally of said boom, and an arm fixed to the shovel and pivoted to the carriage, said link thereby causing the tilting movement of the shovel upon the longitudinal movement of the carriage.

58. In a machine of the character set forth, the combination with a supporting boom, of a shovel having a hanger extending above the same, a link pivoted to the boom and to the hanger, a carriage movably mounted on the boom, and an arm secured to the shovel and pivoted to the carriage.

59. In a machine of the character set forth, the combination with a supporting boom having tracks, of a frame mounted on the outer end of the boom, a shovel operating beneath the boom, a link connection between said shovel and the frame, a carriage movable longitudinally of the boom and having rollers operating on the tracks thereof, means for moving the carriage longitudinally of the boom, and an arm fixed to the shovel and having a pivotal connection with the carriage.

60. In a machine of the character set forth, the combination with a bed-frame, of a turntable rotatably mounted thereon, a mast supported on the turntable, a boom pivotally associated with the mast and turntable, means mounted on the mast and turntable for swinging the boom, material holding means located at the outer end of the boom, a swinging link connection between the material holding means and the boom, a carriage movable longitudinally on the boom, means for moving the carriage, and a pivotal connection between the material holding means and said carriage.

61. In a machine of the character set forth, the combination with a support, of a shovel movably associated therewith, and mechanism for moving said shovel with respect to the support, said mechanism including an operating member movable longitudinally on the support, and means for clutching the shovel to said member.

62. In a machine of the character set forth, the combination with a supporting boom, of material-holding means movably associated therewith, and mechanism for moving said holding means, said mechanism including a cable movable longitudinally of the boom, and means for clutching the material holding means to said cable.

63. In a machine of the character set forth, the combination with a supporting boom, of material holding means associated therewith, a member movable longitudinally of the boom, a carriage movable longitudinally on the boom and connected to the holding means, and means for clutching the carriage to the member.

64. In a machine of the character set forth, the combination with a supporting boom, of material holding means movably associated therewith, a cable movable longitudinally of the boom, a carriage movable longitudinally on the boom and connected to the holding means, and means for clutching the carriage to the cable.

65. In a machine of the character set forth, the combination with a supporting boom, of material holding means associated therewith, an operating member movable longitudinally on the boom, a carriage movable longitudinally on the boom and connected to the holding means, means for clutching the carriage to the member, and means for automatically unclutching the carriage from the member.

66. In a machine of the character described, the combination with a supporting boom, of material holding means movably associated therewith, an operating cable movable longitudinally of the boom, means for automatically operating the cable, means for clutching the holding means to the cable, and means for automatically unclutching the same therefrom.

67. In a machine of the character set forth, the combination with a supporting boom, of a shovel, a link connection between the shovel and boom, a cable movable longitudinally of the boom, means for operating the cable, a carriage connected to the shovel, and clutch mechanism for connecting the carriage to the cable.

68. In a machine of the character set forth, the combination with a supporting boom, of a shovel, a link connection between the shovel and boom, a cable movable longitudinally of the boom, means for operating the cable, a carriage connected to the shovel, and clutch mechanism movably mounted on the carriage for connecting the same to the cable.

69. In a machine of the character set forth, the combination with a supporting boom, of a shovel associated therewith, a swinging link connection between the open end of the shovel and the boom, a carriage movable longitudinally on the boom, a pivotal connection between the shovel and carriage, a cable movable longitudinally of the boom, means for operating the cable, and clutch mechanism for connecting the carriage to the cable.

70. In a machine of the character set forth, the combination with a supporting boom, of a shovel associated therewith, a swinging link connection between the open end of the shovel and the boom, a carriage movable longitudinally on the boom, a pivotal connection between the shovel and carriage, a cable movable longitudinally of the boom, means for operating the cable, manually operated clutch mechanism for connecting the carriage to the cable, and automatic means for unclutching the carriage from the cable.

71. In a machine of the character set forth, the combination with a supporting boom, of material holding means associated therewith, an operating member movable longitudinally of the boom, a carriage connected to the holding means and movable on the boom, and a clamping jaw movably mounted on the carriage and movable into coaction with the operating member.

72. In a machine of the character set forth, the combination with a supporting boom, of material holding means associated therewith, an operating member movable longitudinally of the boom, a carriage connected to the holding means and movable on the boom, a clamping jaw movably mounted on the carriage and movable into coaction with the operating member, manually operated means for throwing the jaw into operation, and automatic means for disengaging said jaw from the operating member.

73. In a machine of the character set forth, the combination with a supporting beam, of material holding means associated therewith, an operating cable movable longitudinally of the boom, a carriage connected to the holding means and movable on the boom, a swinging clamping jaw movably mounted on the carriage and movable into coaction with the cable, and means mounted on the boom for throwing the jaw into operation.

74. In a machine of the character set forth, the combination with a supporting boom, of a shovel associated therewith, a carriage movable on the boom and connected to the shovel, an operating cable extending and operating through the carriage, and a clamp movably mounted on the carriage and movable into and out of coaction with the cable.

75. In a machine of the character set forth, the combination with a supporting boom, of a shovel associated therewith, a carriage movable on the boom and connected to the shovel, an operating cable movable longitudinally of the boom, means mounted on the carriage for clutching said movable carriage to the cable, and mechanism for operating the clutching means including a shaft disposed longitudinally of the boom.

76. In a machine of the character set forth, the combination with a supporting boom, of a shovel associated therewith, a carriage movable on the boom and connected to the shovel, an operating cable movable longitudinally of the boom, means mounted on the carriage for clutching said movable carriage to the cable, and mechanism for operating the clutching means including a rock shaft disposed longitudinally of the boom, means for throwing the shaft, and a dog carried by the clutch and interlocking with the shaft.

77. In a machine of the character set forth, the combination with a supporting boom, of a shovel associated therewith, a carriage movable on the boom and connected to the shovel, an operating cable on the boom, a swinging clamp on the carriage, a rock shaft journaled on the boom and having a key-way, and a dog pivoted on the clamp and movable into the key-way.

78. In a machine of the character set forth, the combination with a supporting boom, of a shovel associated therewith, a carriage movable on the boom and connected to the shovel, an operating cable on the boom, a swinging clamp on the carriage, a rock shaft journaled on the boom, and having a key-way, a dog pivoted on the clamp and movable into the key-way, and a lever having connections with the shaft for turning the same.

79. In a machine of the character set forth, the combination with a supporting boom, of a shovel associated therewith, a carriage movably mounted on the boom and connected to the shovel, an operating cable movable on the boom, a swinging clamp mounted on the carriage and co-operating with the cable, a rock-shaft mounted on the boom and having a key-way, a dog movably mounted on the clamp and movable into the key-way, and means for moving the dog into the key-way.

80. In a machine of the character set forth, the combination with a supporting boom, of a shovel associated therewith, a carriage movably mounted on the boom and connected to the shovel, an operating cable movable on the boom, a swinging clamp mounted on the carriage and co-operating with the cable, a rock-shaft mounted on the boom and having a key-way, a dog movably mounted on the clamp and movable into the key-way, and means for moving the dog out of the key-way.

81. In a machine of the character set forth, the combination with a supporting boom, of a shovel-associated therewith, a carriage movably mounted on the boom and connected to the shovel, an operating cable movable on the boom, a swinging clamp mounted on the carriage and cooperating with the cable, a rock-shaft mounted on the boom and having a key-way, a dog movably mounted on the clamp and movable into the key-way, automatic means for moving the dog into the key-way, and automatic means for moving the dog out of the key-way.

82. In a machine of the character set forth, the combination with a supporting boom, of a shovel associated therewith, a swinging link connection between the shovel and the boom, a carriage movable longitudinally on the boom, a pivotal connection between the shovel and carriage, a cable operating longitudinally of the boom, a clamping jaw pivotally mounted on the carriage and movable into and out of coaction with the cable to clamp the carriage thereto, a rock-shaft extending through the carriage and having a key-way, a dog pivoted on the clamp and movable into the key-way, and a lever having connections with the rock-shaft for turning the same.

83. In a machine of the character set forth, the combination with a boom having tracks, of a shovel movably associated with the boom, a carriage movable longitudinally on the boom and having rollers running on the tracks, a cable operating longitudinally of the boom and passing through the carriage, a swinging clamp having a tubular gudgeon journaled in the carriage, said clamp being movable into and out of coaction with the cable, a rock-shaft journaled in the boom and passing through the tubular gudgeon, said rock-shaft having a key-way, a dog pivoted on the clamp and having a tooth movable into the key-way, means mounted on the boom and disposed in the path of movement of the dog for swinging the same to carry the tooth out of the key-way, and means for turning the rock-shaft.

84. In a machine of the character set forth, the combination with a support, of material-holding means associated therewith, operating means having portions moving in opposite directions on the support, and means for clutching the material-holding means to either of said portions to cause the opposite movements of the holding means.

85. In a machine of the character set forth, the combination with a support, of material holding means associated therewith, an endless cable operating on the support and having stretches moving in opposite directions, and means for clutching the material holding means to either stretch of said cable.

86. In a machine of the character set forth, the combination with a supporting boom, of a shovel associated therewith, an operating cable mounted on the boom and having stretches moving in opposite directions, and means for connecting the shovel to either stretch to move said shovel in opposite directions.

87. In a machine of the character set forth, the combination with a support, of material holding means associated therewith, operating means having portions moving in opposite directions on the support, a carriage movable in opposite directions on the support and connected to the holding means, and means for clutching the carriage to either portion of said operating means to move the carriage and thereby the material holding means in either direction.

88. In a machine of the character set forth, the combination with a supporting boom, of a shovel associated therewith, an endless cable mounted on the boom and having stretches moving in opposite directions thereon, a carriage movable in opposite directions on the boom and connected to the shovel, and means for clutching the carriage to either stretch of the cable to move said carriage and thereby the shovel in opposite directions.

89. In a machine of the character set forth, the combination with a supporting boom, of a shovel associated therewith, an endless cable mounted on the boom and having stretches moving in opposite directions thereon, a carriage movable in opposite directions on the boom and connected to the shovel, and clamping means movably mounted on the carriage for clutching said carriage to either stretch of the cable to move the carriage and thereby the shovel in either direction.

90. In a machine of the character set forth, the combination with a supporting boom, of a shovel associated therewith, an endless cable mounted on the boom and having stretches moving in opposite directions thereon, a carriage movable in opposite directions on the boom and connected to the shovel, and an oscillatory clamp journaled on the carriage and having jaws movable respectively into coaction with either stretch of the cable to clamp the carriage thereto and thereby move said carriage in either direction.

91. In a machine of the character set forth, the combination with a supporting boom, of a shovel associated therewith, a carriage connected to the shovel and movable in opposite directions on the boom, an endless operating cable having oppositely moving stretches mounted on the boom, an oscillatory clamp journaled on the carriage and having jaws that are movable into coaction with either stretch of the cable, a rock-shaft disposed longitudinally of the cable and passing through the carriage, said rock-shaft having key-ways, and dogs movably mounted on the clamp and respectively coöperating with the key-ways.

92. In a machine of the character set forth, the combination with a supporting boom, comprising spaced side members having tracks, of a shovel, a swinging link connection between the open end of the shovel and the boom, a carriage movable longitudinally between the side members of the boom and having rollers running on the tracks, a pivotal connection between the shovel and the carriage, an endless cable operating longitudinally of the boom and having oppositely moving stretches that pass through the carriage, an oscillatory clamp having a tubular gudgeon journaled in the carriage and having oppositely extending jaws that respectively coöperate with the stretches of the cable to clamp the carriage to the same, a rock-shaft journaled between the side members of the boom and passing through the tubular gudgeon, said rock-shaft having key-ways in its opposite side, a pair of dogs pivoted on the clamp and having teeth that respectively operate in the key-ways, and a lever connected to the rock-shaft for turning the same.

93. In a machine of the character set forth, the combination with a supporting boom, of a shovel associated therewith, a carriage movable on the boom, a cable movable on the boom, clamp jaws movable with the cable, a rock-shaft having key-ways, dogs carried by the clamp jaws and movable into and out of the key-ways, and means for automatically moving one dog out of its key-way and swinging the clamp jaws to carry the other jaw into its key-way.

94. In a machine of the character set forth, the combination with a supporting boom, of a shovel associated therewith, a carriage movable on the boom, a cable movable on the boom, clamp jaws movable with the cable, a rock-shaft having key-ways, dogs carried by the clamp jaws and movable into and out of the key-ways, means for automatically moving one dog out of its key-way and swinging the clamp jaws to carry the other jaw into its key-way, and manual means for turning the rock-shaft.

95. In a machine of the character set forth, the combination with a boom, of a shovel having a swinging link connection with the outer end thereof, a carriage movable longitudinally on the boom and having a pivotal connection with the shovel, an endless cable disposed longitudinally of the boom and having oppositely moving stretches thereon, a clamp movably mounted on the carriage, and having jaws that respectively coöperate with the different stretches of the cable to clutch the carriage thereto, a rock-shaft having key-ways, dogs pivotally mounted on the clamp and having portions that engage in the key-ways, and automatic means mounted on the boom and disposed in the paths of movement of the dogs to respectively swing said dogs and also move the jaws.

96. In a machine of the character set forth, the combination with a turntable, of a boom mounted thereon, sheaves located at the ends of the boom, an endless cable operating around the sheaves, a shovel, a carriage connected to the shovel and operating on the boom, clutch mechanism for connecting the carriage to the cable, and means connected to the inner sheave for rotating the same.

97. In a machine of the character set forth, the combination with a turntable, of a boom mounted thereon, sheaves located at the ends of the boom, an endless cable operating around the sheaves, a shovel, a carriage connected to the shovel and operating on the boom, clutch mechanism for connecting the carriage to the cable, an upright shaft journaled in the turntable, means for rotating said shaft, and gear connections between the shaft and the inner sheave.

98. In a machine of the character set forth, the combination with a supporting bed-frame, of a base mounted thereon, a turntable rotatably mounted on the base, a mast carried by the turntable, a swinging boom associated with the turntable and mast, an endless cable mounted on the mast and having a connection with the boom, a sheave around which said cable passes, a driving wheel associated with the sheave, means for clutching the driving wheel to the sheave, an upright shaft journaled centrally in the turntable, a gear wheel carried by the upper end of the shaft and geared to the drive wheel, a countershaft journaled in the base and geared to the upright shaft, a shovel associated with the outer end of the boom, a swinging link connection between the open end of the shovel and the boom, a carriage movable longitudinally on the boom and having a pivotal connection with the shovel, another sheave, a gear connection between said sheave and the gear that is on the upper end of the upright shaft, an endless cable passing around the latter sheave and disposed longitudinally of the boom, said cable having spaced stretches moving in opposite directions, and means for clutching the carriage to and unclutching it from either stretch of said latter cable.

99. In a machine of the character set forth, the combination with a boom, of a carriage movable longitudinally thereon, a shovel connected to the carriage, means for moving the carriage including clutch mechanism mounted thereon, and means for automatically operating the clutch mechanism including trip hooks movably mounted on the boom and disposed in the path of movement of portions of the clutch mechanism.

100. In a machine of the character set forth, the combination with a boom, of a carriage movable longitudinally thereon, a shovel connected to the carriage, means for moving the carriage including clutch mechanism mounted thereon, and means for automatically operating the clutch mechanism including trip hooks movably mounted on the boom, swinging arms on which said hooks are supported, and springs for resisting the movements of the hooks and arms.

101. In a machine of the character set forth, the combination with a supporting boom, of a shovel associated therewith, a carriage movable on the boom and connected to the shovel, operating means for the carriage, clutch mechanism for connecting the carriage to the operating means, and a lock for holding the carriage against movement when unclutched from the operating means.

102. In a machine of the character set forth, the combination with a supporting boom, of a shovel associated therewith, a carriage movable on the boom and connected to the shovel, operating means for the carriage, clutch mechanism for connecting the carriage to the operating means, and a lock, said lock comprising a hook pivoted on the boom, and a projection from the carriage that interlocks therewith.

103. In a machine of the character set forth, the combination with a supporting boom, of a shovel associated therewith, a carriage movable on the boom and connected to the shovel, operating means for the carriage, clutch mechanism for connecting the carriage to the operating means, and a lock, said lock comprising a hook pivoted on the boom, an arm pivoted to the hook, and a projection movably mounted on the carriage and engaging between the hook and arm.

104. In a machine of the character set forth, the combination with a supporting boom, of a shovel associated therewith, a carriage connected to the shovel and movable longitudinally on the boom, a cable operating longitudinally of the boom, clutch mechanism movably mounted on the carriage and coöperating with the cable to clamp said carriage thereto, said clutch mechanism having a projection, a hook pivoted on the boom and arranged to be engaged by said projection, means operated by the projection on its movement to disengage the hook therefrom, and means for operating the clutch mechanism.

105. In a machine of the character set forth, the combination with a turntable, of a mast mounted thereon, a swinging boom, means mounted on the mast for swinging and supporting the boom, a shovel located at the outer end of the boom, a swinging link connection between the open end of the shovel and the boom, a carriage longitudinally movable on the boom and having a pivotal connection with the shovel, and means for moving the carriage in opposite directions on the boom.

106. In a machine of the character set forth, the combination with a supporting frame, of a base mounted thereon, a turntable rotatably mounted on the upper portion of the base, and steering wheels having a rotatable bearing against the lower portion of the base.

107. In a machine of the character set forth, the combination with a supporting frame, of a base mounted thereon, a turntable rotatably mounted on the upper portion of the base, said base having an annular bearing on its lower portion, an axle, ground wheels mounted on the axle, and rollers carried by the axle and operating against the track of the base.

108. In a machine of the character set forth, the combination with a supporting frame, of a tubular base mounted thereon and having internal annular tracks at its lower end, a turntable rotatably mounted on the upper end of the base, shovel-supporting and controlling means carried by the turntable, an axle extending transversely beneath the base, ground wheels on the axle, and rollers connected to the axle and operating against the internal track of the base.

109. In a machine of the character set forth, the combination with a vehicle body, of shovel supporting and operating means thereon, an annular track on said body, cross arms, rollers journaled on the said arms and operating against the track, an axle secured to the arms, and ground wheels mounted on the axle.

110. In a machine of the character set forth, the combination with a vehicle body, of shovel supporting and operating means thereon, an annular track on said body, a head, cross arms secured to the head, rollers journaled on the arms and operating against the track, an axle connected to the head, and ground wheels on the axle.

111. In a machine of the character set forth, the combination with a vehicle body, of shovel supporting and operating means thereon, an annular track on said body, a head having depending ears, cross arms secured to the head, rollers journaled on the cross arms and operating against the track, an axle disposed transversely of the track and pivoted to the depending ears, and ground wheels mounted on the axle.

112. In a machine of the character set forth, the combination with a supporting frame, of a base secured thereto, a turntable mounted on the base, shovel supporting and operating means mounted on the turntable, an annular track carried by the lower end of the turntable, a head mounted centrally of the turntable and having outstanding cross arms, rollers journaled on the cross arms and operating against the track, an axle secured to the head, and ground wheels journaled on the axle.

113. In a machine of the character set forth, the combination with a supporting frame, of a base mounted thereon, a turntable rotatably mounted on the base, steering wheels having a rotatable bearing against the lower portion of the base, a steering shaft, connections between the steering shaft and axle, and means for holding the steering shaft against rotation.

114. In a machine of the character set forth, the combination with a supporting frame, of a base mounted thereon, a turntable rotatably mounted on the upper portion of the base, said base having a lower annular track, an axle disposed transversely of the base, rollers connected to the axle and operating against the track, ground wheels carried by the axle, a sheave disposed in advance of the axle, a cable connected to the ends of the axle and passing around the sheave, a steering shaft, a cable connected to the ends of the axle and passing around the steering shaft, a toothed wheel secured to the steering shaft, and a dog cooperating with the toothed wheel to prevent the rotation of the steering shaft.

115. In a machine of the character set forth, the combination with a vehicle, of shovel operating mechanism mounted thereon, propelling mechanism for the vehicle, a motor mounted on the vehicle, and means for transmitting power from the motor to the shovel operating mechanism or to the propelling mechanism.

116. In a machine of the character set forth, the combination with a vehicle, of shovel supporting and operating means mounted thereon including a rotatable driving member, and propelling mechanism for the vehicle including a rotatable driving member associated with the first mentioned member, a motor mounted on the vehicle, and means driven by the motor and shiftable to either driving member for transmitting power from the motor to the shovel operating means or to the propelling mechanism.

117. In a machine of the character set forth, the combination with a vehicle, of shovel supporting and operating mechanism mounted thereon, including a driving shaft having a pulley, propelling mechanism for the vehicle, including a loose pulley journaled on the driving shaft alongside the pulley thereof, a motor mounted on the vehicle, a belt driven by the motor and shiftable on to either pulley, and means for shifting the belt.

118. In a machine of the character set forth, the combination with a vehicle, of shovel operating mechanism mounted thereon, propelling mechanism for the vehicle, a motor mounted on the vehicle, and means for transmitting power from the motor to the shovel operating mechanism or to the propelling mechanism including a combined belt shifter and tightener device.

119. In a machine of the character set forth, the combination with a vehicle, of shovel supporting and operating mechanism mounted thereon, including a rotatable driving member, propelling mechanism for the vehicle, including a rotatable driving member associated with the first mentioned member, a motor mounted on the vehicle, a belt driven by the motor and shiftable on to either driving member, a frame movably associated with the belt, an idler movable on the frame and coacting with the belt, and a shifting lever fulcrumed on the frame and engaged with the idler.

120. In a machine of the character set forth, the combination with a vehicle, including a frame, of shovel supporting and operating mechanism mounted on the frame, and including a rotatable driving pulley, propelling mechanism for the vehicle including a rotatable driving pulley disposed alongside the first mentioned pulley, a motor, a belt driven by the motor and shiftable to either pulley, a substantially U-shaped frame vertically adjustable on the supporting frame, means for holding the frame in different vertical positions, an idler engaged with one stretch of the belt, and shiftable transversely of said belt, and a lever fulcrumed on the frame and engaged with the pulley for shifting the same.

121. In a machine of the character set forth, the combination with a vehicle, of shovel supporting and operating mechanism mounted thereon, including a driving shaft having a pulley, propelling mechanism for the vehicle, including a loose pulley journaled on the driving shaft alongside the pulley thereof, a motor mounted on the vehicle, a belt driven by the motor and shiftable on to either pulley, a vertically adjustable idler support mounted on the vehicle, an idler journaled on the support and engaged with the belt, and means mounted on the idler support and engaged with the idler for shifting the same and thereby the belt.

122. In a machine of the character set forth, the combination with a vehicle, of shovel supporting and operating means mounted thereon, a motor mounted on the vehicle, propelling wheels for the vehicle, oppositely disposed rotatable driving members operated from the motor, and means for clutching either member to the wheel for moving the vehicle in either direction.

123. In a machine of the character described, the combination with a vehicle, of shovel supporting and operating means mounted thereon, a motor mounted on the vehicle, a rotatable driving axle or shaft having propelling wheels, oppositely rotatable driving members rotatable on the driving axle or shaft, means connecting the motor to the members for simultaneously rotating them in opposite directions, and means for clutching either member to the axle or shaft.

124. In a machine of the character described, the combination with a vehicle, of shovel supporting and operating means mounted thereon, a motor mounted on the vehicle, a rotatable driving axle or shaft having propelling wheels, oppositely rotatable driving members rotatable on the driving axle or shaft, means connecting the motor to the members for simultaneously rotating them in opposite directions, a clutch associated with each member for connecting it to the axle or shaft, and a common actuator for moving one clutch out of and the other into operation and vice versa.

125. In a machine of the character described, the combination with a vehicle, of shovel supporting and operating means mounted thereon, a motor mounted on the vehicle, a rotatable driving axle or shaft having propelling wheels, oppositely rotatable driving members rotatable on the driving axle or shaft, means connecting the motor to the members for simultaneously rotating them in opposite directions, a clutch associated with each member for connecting it to the axle or shaft, a stirrup movable longitudinally of the shaft and having arms connected to the clutches, and means for moving the arms.

126. In a machine of the character set forth, the combination with a vehicle, of shovel supporting and operating means mounted thereon, a motor mounted on the vehicle, a rotatable driving axle or shaft having propelling wheels, oppositely rotatable driving members mounted on the axle or shaft, means connecting the motor to the members for simultaneously rotating them in opposite directions, a clutch associated with each member for connecting it to the axle or shaft, a supporting bracket having a slot, a stirrup movable longitudinally of the shaft and having arms extending through the slots and connected to the clutches, rollers carried by the stirrup, and engaging the bracket, and means for moving the stirrup.

127. In a machine of the character set forth, the combination with a vehicle, of shovel supporting and operating means mounted thereon, a motor mounted on the vehicle, a rotatable driving axle or shaft journaled on the vehicle and having propelling ground wheels, oppositely rotatable gear wheels loosely journaled on the axle or shaft and having peripheral rims, driving means operated by the motor and including a shaft having a gear wheel that meshes with both of the oppositely rotatable wheels, clutch mechanisms secured to the axle or shaft and having shoes that detachably engage the rims of the wheels, and mechanism for moving either set of shoes into operation, said mechanism including a stirrup having arms, yokes carried by the arms, collars engaged by the yokes and connected to the shoes, and an actuating lever connected to the stirrup.

128. In a machine of the character set forth, the combination with a vehicle, of a motor mounted thereon, a driving shaft having a pulley secured thereto, a loose pulley journaled on the shaft, a belt driven from the motor and shiftable to either pulley, means for shifting the belt, a turntable rotatably mounted on the vehicle, a shovel supporting and operating means carried by the turntable, means operated from the driving shaft for rotating the turntable and actuating said shovel-operating means, a rotatable propelling shaft or axle, rotatable propelling wheels carried thereby, oppositely rotatable driving members loosely journaled on the shaft or axle, means operated from the loose pulley on the driving shaft for rotating said members in opposite directions, and means for clutching either member to the rotatable driving axle or shaft.

129. In a machine of the character set forth, the combination with a vehicle, of shovel supporting and operating means mounted thereon, a motor mounted on the vehicle, driving connections between the motor and the shovel supporting and operating means, a driving axle or shaft operated by the motor, driving wheels journaled on the axle or shaft, and means for clutching the wheels to and unclutching them from the driving axle or shaft.

130. In a machine of the character set forth, the combination with a vehicle, of shovel supporting and operating means mounted thereon, a motor mounted on the vehicle, a driving axle or shaft operated by the motor, driving wheels journaled on the axle or shaft, and means for clutching each wheel to and unclutching it from the axle or shaft independently of the other wheel.

131. In a machine of the character set forth, the combination with a vehicle, of shovel supporting and operating means mounted thereon, a motor mounted on the vehicle, separate driving wheels, connections between the motor and the driving wheels including clutches, and manually operated means for operating the clutch of each wheel independently of the clutch of the other wheel.

132. In a machine of the character set forth, the combination with a vehicle, of shovel supporting and operating means mounted thereon, a motor mounted on the vehicle, a driving wheel, connections between the motor and driving wheel including a clutch, and manual means for operating the clutch, said means having yielding connections with the clutch.

133. In a machine of the character set forth, the combination with a vehicle, of shovel supporting and operating means mounted thereon, a motor mounted on the vehicle, a driving wheel, connections between the motor and driving wheel including a clutch, an actuating lever, and yielding means for moving the lever and clutch.

134. In a machine of the character set forth, the combination with a vehicle, of shovel supporting and operating means mounted thereon, a motor mounted on the vehicle, a driving axle or shaft operated by the motor, driving wheels journaled on the axle or shaft, clutch connections between the axle and wheels, manually operated actuating levers, and yielding connections between the levers and the clutches.

135. In a machine of the character set forth, the combination with a vehicle, of shovel supporting and operating means mounted thereon, a motor mounted on the vehicle, a driving axle or shaft operated by the motor, driving wheels journaled on the axle or shaft and having hubs provided with seats, sleeves fixed to the driving axle or shaft, dogs pivoted on the sleeves and movable into and out of the seats, movable rings engaging the dogs for swinging the same, slidable stems having connections with the rings, bell crank levers engaged with the stems, actuating levers, links connected to the actuating levers and having yokes in which the bell crank levers engage, and springs located in said yokes and bearing against the bell crank levers.

136. In a machine of the character set forth, the combination with a boom, of means for raising and lowering and swinging said boom, a movable shovel or carrier mounted on the outer end of the boom and comprising walls formed of spaced rods, a lining that detachably engages in the shovel for closing the spaces between the rods, and means for moving the shovel.

137. In a machine of the character set forth, the combination with a support having a track or guide, of a shovel movable longitudinally along said track or guide.

138. In a machine of the character set forth, the combination with a swinging boom having a track or guide, of a shovel having wheels that run along said track or guide.

139. In a machine of the character set forth, the combination with a support, of a swinging link associated therewith, a track or guide on the support, and a carrier movable on the track or guide and having a connection with the link.

140. In a machine of the character set forth, the combination with a support, of a swinging link mounted thereon, a track or guide on the support, a shovel or carrier that is movable on the track or guide and has a detachable connection with the link, and means for effecting the movement of the carrier and its detachment from and reengagement with the link.

141. In a machine of the character set forth, the combination with a boom having spaced longitudinal tracks, of a link pivoted to the outer end of the boom, a shovel, means for moving the shovel longitudinally of the boom, said shovel having rollers that run upon the tracks, and means carried by the lower end of the link and detachably engaging with the shovel to carry the outer end of said shovel when the rollers disengage from the track.

142. In a machine of the character set forth, the combination with a boom having spaced tracks, of a carriage movable on the tracks, means for moving the carriage in opposite directions, a swinging link having a hook at its lower end, a shovel having a connection with the carriage, and having a detachable connection with the hook of the link, rollers mounted on the shovel and operating on the tracks when said shovel is disengaged from the hook, a latch mounted on the hook and retaining the same in engagement with the shovel when the rollers are out of engagement with the track, and means for automatically operating the latch.

In testimony, that I claim the foregoing as my own, I have hereto affixed my signature in the presence of two witnesses.

CHARLES M. WEAVER.

Witnesses:
W. M. GWIN,
E. A. SHELFER.